US012755282B2

(12) United States Patent
Yamamoto et al.

(10) Patent No.: US 12,755,282 B2
(45) Date of Patent: Oct. 6, 2026

(54) CONTROL METHOD, IoT DEVICE, AND RECORDING MEDIUM

(71) Applicant: Panasonic Intellectual Property Corporation of America, Torrance, CA (US)

(72) Inventors: Kakuya Yamamoto, Hyogo (JP); Yuji Unagami, Osaka (JP); Naohisa Nishida, Osaka (JP); Yuuki Hirose, Osaka (JP); Junji Michiyama, Fukuoka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 204 days.

(21) Appl. No.: 18/381,314

(22) Filed: Oct. 18, 2023

(65) Prior Publication Data

US 2024/0046269 A1 Feb. 8, 2024

Related U.S. Application Data

(63) Continuation of application No. PCT/JP2022/018151, filed on Apr. 19, 2022.

(60) Provisional application No. 63/178,215, filed on Apr. 22, 2021.

(51) Int. Cl.
*G06Q 20/00* (2012.01)
*G06Q 20/40* (2012.01)

(52) U.S. Cl.
CPC .................................. *G06Q 20/401* (2013.01)

(58) Field of Classification Search
CPC .................................................... G06Q 20/401
See application file for complete search history.

(56) References Cited

U.S. PATENT DOCUMENTS 11,037,169 B1 * 6/2021 Bhatt .................. G06Q 30/016
11,072,538 B2 * 7/2021 Bishop ................. G06V 10/764
11,909,887 B2 * 2/2024 Patil ....................... G16Y 40/35
12,273,458 B2 * 4/2025 Kocsis .................. H04L 41/044
(Continued)

FOREIGN PATENT DOCUMENTS

CN 112308689 2/2021

OTHER PUBLICATIONS

A Hybrid Model for Central Bank Digital Currency Based on Blockchain, IEEE (Year: 2021).*
(Continued)

*Primary Examiner* — Bruce I Ebersman
(74) *Attorney, Agent, or Firm* — Wenderoth, Lind & Ponack, L.L.P.

(57) ABSTRACT

A control method in which each of an Internet of things (IoT) device and a user who uses the IoT device has a digital account includes: obtaining first transaction data for allowing the user who used the IoT device to transfer a first amount corresponding to a usage amount of the IoT device; specifying, from the first transaction data obtained, the digital account of the IoT device that is associated with an identifier uniquely assigned to hardware of the IoT device; and transferring the usage amount of the IoT device to the digital account of the IoT device by deducting the first amount from the digital account of the user and adding the first amount to the digital account of the IoT device based on the first transaction data obtained.

14 Claims, 21 Drawing Sheets

(56) References Cited

U.S. PATENT DOCUMENTS

| | | | | |
|---|---|---|---|---|
| 2017/0310747 | A1* | 10/2017 | Cohn | H04W 4/70 |
| 2018/0115885 | A1* | 4/2018 | Berzin | H04M 15/66 |
| 2018/0232734 | A1* | 8/2018 | Smets | G06Q 20/40 |
| 2020/0374127 | A1* | 11/2020 | Wei-Kocsis | H04L 41/5019 |
| 2021/0065070 | A1* | 3/2021 | Augustine | G06F 16/9024 |
| 2021/0149917 | A1* | 5/2021 | Unagami | H04L 9/3213 |
| 2022/0166667 | A1* | 5/2022 | Celozzi | H04W 48/14 |
| 2024/0046269 | A1* | 2/2024 | Yamamoto | G06Q 20/14 |

OTHER PUBLICATIONS

Blockchain-Based Verifiable Multi-Keyword Ranked Search on Encrypted Cloud With Fair Payment, IEEE (Year: 2019).*

International Search Report (ISR) issued on Jul. 12, 2022 in International (PCT) Application No. PCT/JP2022/018151.

Andreas Bogner, et al., "A Decentralised Sharing App running a Smart Contract on the Ethereum Blockchain", Proceedings of the 6th International Conference on the Internet of Things, Nov. 2016, pp. 177-178.

* cited by examiner

FIG. 10

| IoT device | | Owner | | | | Allocation | |
|---|---|---|---|---|---|---|---|
| Identifier | Account address | Identifier | Account address | Identifier | Account address | Identifier | |
| | | | | | | xx | yy |
| aaa | | xx | | yy | | 50% | 50% |

CONTROL METHOD, IoT DEVICE, AND RECORDING MEDIUM

CROSS REFERENCE TO RELATED APPLICATIONS

This is a continuation application of PCT International Application No. PCT/JP2022/018151 filed on Apr. 19, 2022, designating the United States of America, which is based on and claims priority of U.S. Provisional Patent Application No. 63/178,215 filed on Apr. 22, 2021. The entire disclosures of the above-identified applications, including the specifications, drawings and claims are incorporated herein by reference in their entirety.

FIELD

The present disclosure relates to IoT device control methods, IoT devices, and recording media.

BACKGROUND

For example, Patent Literature (PTL) 1 discloses a technique that enables billing or payment according to authenticated information on a blockchain exchanged between a retailer and an ADEPT WASHER, which is a washing machine that supports the Internet of things (IoT).

CITATION LIST

Patent Literature

PTL 1: U.S. Patent Application Publication No. 2017/0310747

SUMMARY

Technical Problem

The technique disclosed in PTL 1 is, however, applied to laundromats or the like where at least one fixed owner owns a washing machine. Therefore, when the owner of the IoT device is not fixed, if the owner is replaced or removed or an owner is added, the process of updating the relationship between the IoT device and the owner or identifying the owner, for example, needs to be performed, leading to an increase in the power consumption of the system, which is problematic. Furthermore, this technique cannot be applied when an IoT device such as a washing machine is to be shared and used on a pay-per-use basis or when profit such as a usage fee is to be distributed to two or more owners who can be replaced.

The present disclosure is conceived in view of the above-described circumstances and has an object to provide a control method in which the power consumption efficiency of the system can improve. In addition, an IoT device control method in which an IoT device itself can manage earnings such as a usage fee.

Solution to Problem

In order to achieve the aforementioned object, a control method according to the present disclosure is a control method in which each of an Internet of things (IoT) device and a user who uses the IoT device has a digital account. The control method includes: obtaining first transaction data for allowing the user who used the IoT device to transfer a first amount corresponding to a usage amount of the IoT device; specifying, from the first transaction data obtained, the digital account of the IoT device that is associated with an identifier uniquely assigned to hardware of the IoT device; and transferring the usage amount of the IoT device to the digital account of the IoT device by deducting the first amount from the digital account of the user and adding the first amount to the digital account of the IoT device based on the first transaction data obtained.

Note that these general and specific aspects may be implemented using a system, a method, an integrated circuit, a computer program, or a computer-readable recording medium such as a compact disc read-only memory (CD-ROM), or any combination of systems, methods, integrated circuits, computer programs, or computer-readable recording media.

Advantageous Effects

According to the present disclosure, the power consumption efficiency of the system can improve. In addition, it is possible to provide an IoT device control method, etc., in which an IoT device itself can manage earnings such as a usage fee.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 10 is one example of a table for managing an IoT device, owners, and allocation according to an exemplary embodiment.

DESCRIPTION OF EMBODIMENT

Figure 1:
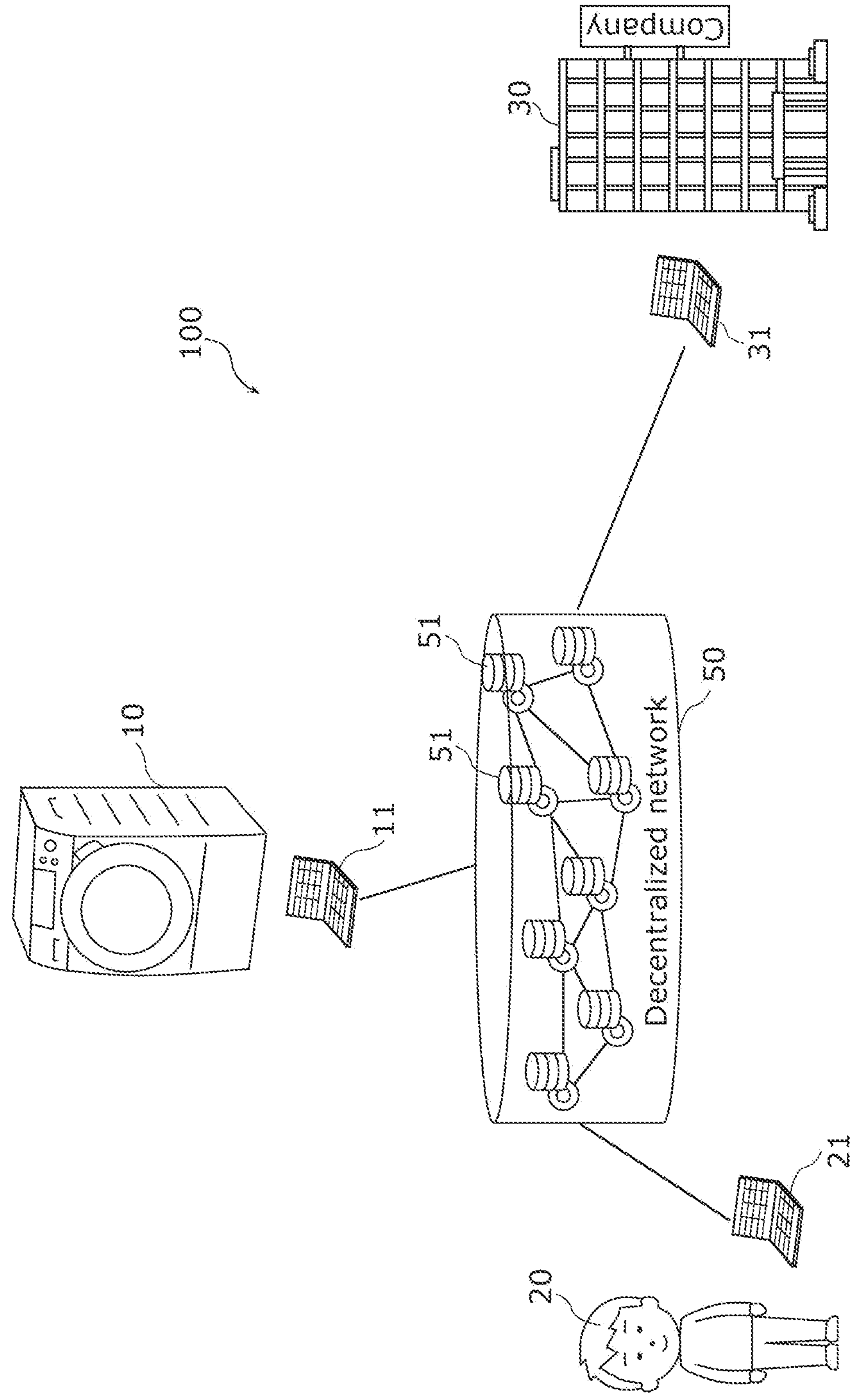
FIG. 1 is a diagram illustrating one example of the overall configuration of a system according to an exemplary embodiment.

A control method according to one aspect of the present disclosure is a control method in which each of an Internet of things (IoT) device and a user who uses the IoT device has a digital account. The control method includes: obtaining first transaction data for allowing the user who used the IoT device to transfer a first amount corresponding to a usage amount of the IoT device; specifying, from the first transaction data obtained, the digital account of the IoT device that is associated with an identifier uniquely assigned to hardware of the IoT device; and transferring the usage amount of the IoT device to the digital account of the IoT device by deducting the first amount from the digital account of the user and adding the first amount to the digital account of the IoT device based on the first transaction data obtained.

When the IoT device has a digital account and a usage fee that is charged for use of the IoT device is transferred to the digital account of the IoT device, instead of the owner of the IoT device, in this manner, the process of identifying the owner of the IoT device can be eliminated. Accordingly, the amount of processing of a processor can be reduced, and the power consumption can be reduced. Furthermore, the IoT device itself can manage earnings such as the usage fee. This allows the transition from a form in which an IoT device is purchased and used as in the conventional technique to a new form in which an IoT device is shared and used by two or more users on a pay-per-use basis.

Furthermore, the first transaction data may include: an address of the digital account of the user, the address indicating a source of payment; an address of the digital account of the IoT device, the address indicating a destination of the payment; and the first amount indicating the usage amount of the IoT device.

Thus, the first transaction data includes: the digital account of the user who uses the IoT device; the digital account of the IoT device; and the amount of tokens that is the usage fee. This makes it easy to transfer the usage fee for the IoT device used by the user from the digital account of the user to the digital account of the IoT device in tokens.

Furthermore, the identifier may include at least one of: a model number of the IoT device; a product number of the IoT device; a serial number of the IoT device; or a license plate of the IoT device.

With this, it is possible to use the digital account associated with the identifier which is a number that cannot be easily changed, and therefore the digital account of the IoT device can be more reliably specified. This allows the IoT device to manage earnings such as the usage fee more reliably.

Furthermore, the control method may further include: obtaining second transaction data for allowing a user who purchased log data of the IoT device to transfer a second amount corresponding to a purchase amount of the log data to the digital account of the IoT device; specifying, from the second transaction data obtained, the digital account of the IoT device that is associated with the identifier uniquely assigned to the hardware of the IoT device; and transferring the purchase amount of the log data to the digital account of the IoT device by deducting the second amount from the digital account of the user and adding the second amount to the digital account of the IoT device based on the second transaction data obtained.

In this manner, the purchase amount charged for purchase of the log data of the IoT device is transferred to the digital account of the IoT device, and thus the IoT device itself can manage earnings including the purchase amount of the log data.

Furthermore, the control method may further include: obtaining third transaction data for transferring a third amount corresponding to a maintenance fee for the IoT device; specifying a digital account of a destination of payment of the maintenance fee from the third transaction data obtained; and transferring the maintenance fee to the digital account of the destination of the payment by deducting the third amount from the digital account of the IoT device and adding the third amount to the digital account of the destination of the payment based on the third transaction data obtained.

In this manner, the maintenance fee for the IoT device is paid from the digital account of the IoT device, and thus the IoT device itself can manage expenses and earnings.

Furthermore, the IoT device may be owned by one or more owners, and the control method may further include the following, performed when the first amount is transferred to the digital account of the IoT device: specifying the one or more owners of the IoT device; determining an amount of allocation for each of the one or more owners specified, by referring to a table showing association between the identifier, the one or more owners of the IoT device, and allocation information indicating allocation for each of the one or more owners; and allocating, to a digital account of each of the one or more owners specified, the first amount transferred to the digital account of the IoT device, according to the amount of allocation determined.

In this manner, the earnings transferred to the digital account of the IoT device is distributed to the owners who are one or more proprietors. This allows the transition from a form in which an IoT device is purchased and used as in the conventional technique to a new form in which an IoT device is owned by two or more users who can be replaced and profit obtained by the IoT device is distributed to the two or more users who own the IoT device.

Furthermore, an address of the digital account may be a blockchain address, and the digital account may be managed on a blockchain.

Thus, the digital account of the IoT device is managed on the blockchain and therefore, the IoT device itself can manage earnings such as the usage fee using the digital account having traceability and tamper-proof features.

Furthermore, the control method may further include: storing, into the blockchain, the first transaction data obtained, to operate a smart contract managed on the blockchain; and causing the smart contract to transfer the first amount from the digital account of the user to the digital account of the IoT device.

In this manner, the use of the smart contract makes it possible to automatically transfer earnings to the digital account of the IoT device.

Furthermore, the control method may further include: allocating, by the smart contract, the first amount transferred to the digital account of the IoT device to a digital account of each of one or more owners specified.

In this manner, the use of the smart contract makes it possible to automatically allocate the profit obtained by the IoT device to the one or more proprietors of the IoT device.

Furthermore, the control method may further include: storing, into a blockchain, the third transaction data obtained, to operate a smart contract managed on the blockchain; and transferring, by the smart contract, the maintenance fee from the digital account of the IoT device to the digital account of the destination of the payment.

In this manner, the use of the smart contract makes it possible to automatically pay the maintenance fee for the IoT device from the digital account of the IoT device.

Furthermore, a first terminal different from the IoT device may obtain the identifier uniquely assigned to the hardware of the IoT device, determine an address of the digital account of the IoT device, output, to a database, information indicating association between the identifier and the address, and cause the database to store the information. For example, the first terminal is a terminal held by a manufacturer that has produced the IoT device.

In this manner, using an address accessible on a network, the IoT device can have a digital account. This allows the IoT device itself to manage earnings such as the usage fee.

Furthermore, the control method may further include: calculating the maintenance fee for the IoT device; when a balance of the digital account of the IoT device is less than the maintenance fee calculated, generating fourth transaction data for requesting payment of the maintenance fee on behalf of the IoT device, and transmitting, to one or more other IoT devices different from the IoT device, the fourth transaction data generated; and when a balance of a digital account of a first IoT device included in the one or more other IoT devices is greater than the maintenance fee calculated, obtaining the third transaction data, and transferring the maintenance fee from the digital account of the first IoT device to the digital account of the destination of the payment of the maintenance fee. Here, for example, the maintenance fee includes at least one of: a cost of electricity corresponding to electric power consumed to operate the IoT device; a maintenance cost for the IoT device; a cost of a consumable item of the IoT device; or a travel expense for a user who conducts maintenance on the IoT device.

In this manner, when expenses such as the maintenance fee cannot be paid because the balance of the digital account of the IoT device is insufficient, the expenses can be covered and paid by another IoT device. This allows the IoT device itself to manage expenses and earnings without user intervention.

Furthermore, the control method may further include: calculating the maintenance fee for the IoT device; when a balance of the digital account of the IoT device is less than the maintenance fee calculated, transmitting, to one or more other IoT devices different from the IoT device, credit information including log information of the IoT device or balance information of the digital account of the IoT device; obtaining a fourth amount corresponding to a loan amount for the maintenance fee from a first IoT device determined to pay the maintenance fee on behalf of the IoT device, the first IoT device being included in the one or more other IoT devices; obtaining the third transaction data; specifying the digital account of the destination of the payment of the maintenance fee from the third transaction data obtained; and transferring the fourth amount from the digital account of the IoT device to the digital account of the destination of the payment based on the third transaction data obtained and the fourth amount. Here, for example, the fourth amount includes information regarding at least one of: the loan amount; an interest rate; or a loan period.

In this manner, when expenses such as the maintenance fee cannot be paid because the balance of the digital account of the IoT device is insufficient, the expenses can be paid with a loan from another IoT device and then, when the balance increases, the loan can be repaid. This allows the IoT device itself to manage expenses and earnings without user intervention.

Furthermore, the control method may further include: when the balance of the digital account of the IoT device exceeds the maintenance fee, specifying a digital account of the first IoT device from the fourth amount; and transferring tokens corresponding to the fourth amount from the digital account of the IoT device to the digital account of the first IoT device.

Furthermore, the IoT device may be photovoltaic equipment that transmits electric power generated using a solar cell, the user may use the electric power through use of the photovoltaic equipment, and the usage amount of the IoT device may be an amount on an electric bill.

In this manner, the amount on an electric bill may be received as earnings. Thus, the amount on an electric bill that is earnings transferred to the digital account of the IoT device can be distributed to the owners who are the one or more proprietors.

In an Internet of things (IoT) device according to one aspect of the present disclosure, each of the IoT device and a user who uses the IoT device has a digital account. The IoT device includes: a communicator that obtains first transaction data for allowing the user who used the IoT device to transfer a first amount corresponding to a usage amount of the IoT device; a specifying unit that specifies, from the first transaction data obtained, the digital account of the IoT device that is associated with an identifier uniquely assigned to hardware of the IoT device; and a writer that transfers the usage amount of the IoT device to the digital account of the IoT device by deducting the first amount from the digital account of the user and adding the first amount to the digital account of the IoT device based on the first transaction data obtained.

Hereinafter, an exemplary embodiment will be described with reference to the drawings. Note that each exemplary embodiment described below shows one specific example of the present disclosure. Therefore, the numerical values, shapes, materials, structural elements, the arrangement and connection of the structural elements, steps, the processing order of the steps etc., shown in the following exemplary embodiment are mere examples of the present disclosure, and are not intended to limit the present disclosure. Among the structural elements in the following exemplary embodiment, structural elements not recited in any one of the independent claims which indicates an embodiment according to one aspect of the present disclosure will be described as optional structural elements. The embodiment of the present disclosure is not limited to those recited in the original independent claims and may be represented by other independent claims.

Exemplary Embodiment

Hereinafter, an exemplary embodiment will be described with reference to the drawings.

[1 Overall Configuration]

The present disclosure will describe system 100 in which an IoT device or the like is allowed to have a digital account for digital currencies and transmit and receive the digital currencies on a decentralized network such as a blockchain.

FIG. 1 is a diagram illustrating one example of the overall configuration of system 100 according to the present exemplary embodiment. The present exemplary embodiment assumes, for example, that IoT device 10, user 20, and manufacturer 30 of the IoT device are main elements, as illustrated in FIG. 1. Decentralized network 50 illustrated in FIG. 1 is described as being a blockchain network and including a plurality of BC nodes 51 each including a distributed ledger, for example, but this is not limiting. Distributed network 50 may include a database and a plurality of nodes. Furthermore, system 100 may include a server.

[1.1 IoT Device 10]

IoT device 10 is a home appliance such as a washing machine, for example, as illustrated in FIG. 1, but this is not limiting. IoT device 10 may be a device such as a personal computer installed in a space such as a shared room.

IoT device 10 is connected to decentralized network 50, can communicate with the plurality of BC nodes 51, and can also communicate with a terminal of user 20 and a terminal of manufacturer 30 that are connected to decentralized network 50.

IoT device 10 has digital account 11 that is unique to IoT device 10 on decentralized network 50. IoT device 10 itself manages earnings, etc., using digital account 11. Here, digital account 11 is an assigned address determined in association with an identifier uniquely assigned to hardware of IoT device 10. Information showing the association between the identifier of IoT device 10 and the address assigned thereto is stored into the database. In the present exemplary embodiment, digital account 11 is a blockchain account, and the identifier of IoT device 10 and the address assigned thereto are blockchain addresses. The database is the distributed ledger included in each of the plurality of BC nodes 51. Digital account 11 is similar to a passbook for IoT device 10, for example, that is stored on the distributed ledger; deposits and withdrawals of digital currencies that are earnings and expenses for IoT device 10 are recorded in digital account 11.

Figure 2:
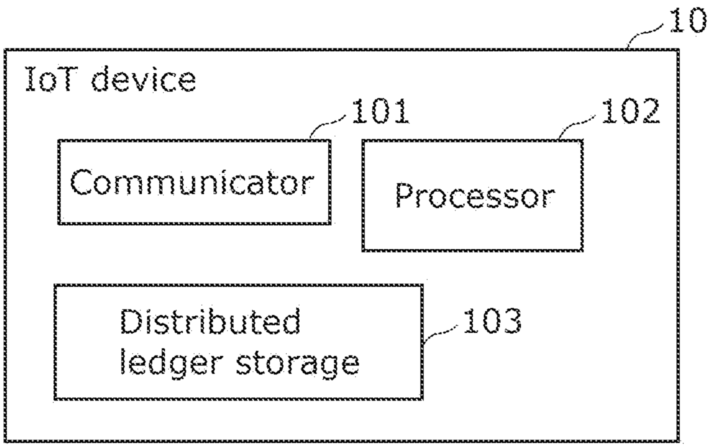
FIG. 2 is a diagram illustrating one example of the configuration of an IoT device according to an exemplary embodiment.

FIG. 2 is a diagram illustrating one example of the configuration of IoT device 10 according to the present exemplary embodiment.

IoT device 10 includes: a processor; a memory in which a program for causing the processor to perform a predetermined process is stored; and a communication interface, for example. In other words, IoT device 10 functions by the processor performing the predetermined program using the memory.

In the present exemplary embodiment, IoT device 10 is provided inside a casing of a home appliance or the like or is provided integrally with the casing. IoT device 10 includes communicator 101, processor 102, and distributed ledger storage 103, as illustrated in FIG. 2. Hereinafter, each structural element will be described.

Communicator 101 performs communication with the plurality of BC nodes 51 and performs communication with the terminal of user 20 and the terminal of manufacturer 30 that are connected to decentralized network 50, for example.

In the present exemplary embodiment, communicator 101 transmits and obtains transaction data, for example. Furthermore, communicator 101 reports a usage fee or a maintenance fee (which may be referred to as a maintenance cost) that has been calculated, for example. The usage fee is one example of the usage amount of IoT device 10. The maintenance fee is one example of the third amount.

When a user uses IoT device 10, processor 102 calculates a usage fee, and when a maintenance fee for maintenance, etc., of IoT device 10 is incurred, processor 102 calculates the maintenance fee, for example. Furthermore, when IoT device 10 is owned by more than one owner and a sizable amount of money is deposited into digital account 11, processor 102 calculates an amount of allocation.

Processor 102 is one example of the specifying unit and the writer. Processor 102 generates transaction data and executes a consensus algorithm for the transaction data among the plurality of BC nodes 51, etc., for example. Furthermore, processor 102 performs the process of writing, into the distributed ledger, the transaction data for which the consensus algorithm has been executed. There are also cases where processor 102 executes a smart contract that has been written into the distributed ledger and is operating in an in-memory database. For example, by executing a payment smart contract, it is possible to distribute, to owners who are one or more proprietors, earnings transferred to digital account 11 of IoT device 10. More specifically, when IoT device 10 is owned by one or more owners and tokens are transferred to digital account 11 of IoT device 10, the payment smart contract can specify the one or more owners of IoT device 10. Furthermore, with reference to a table showing the association between identifiers, the one or more owners of IoT device 10, and allocation information indicating allocation for each of the one or more owners, the payment smart contract can determine an amount of allocation for each of the one or more owners specified. Subsequently, in accordance with the amount of allocation determined, the payment smart contract can allocate, to the digital account of each of the one or more owners specified, the tokens transferred to digital account 11 of IoT device 10. The tokens are one example of the first amount.

In the present exemplary embodiment, when processor 102 calculates a usage fee or the like, processor 102 generates payment transaction data including the digital account of a destination of payment, the digital account of a source of payment, and tokens indicating the fee. The payment transaction data is one example of the first transaction data.

Furthermore, processor 102 may generate log data of IoT device 10 such as a usage history.

Note that in distributed network 50, processor 102 may credit or debit digital account 11 by adding corresponding tokens to digital account 11 or reducing corresponding tokens from digital account 11.

Distributed ledger storage 103 obtains the latest distributed ledger from BC node 51 and stores the latest distributed ledger into a storage device, for example. Note that a distributed ledger having the same content as the distributed ledger held by BC node 51, for example, is stored in distributed ledger storage 103. Deposits to and withdrawals from digital account 11 are written in this distributed ledger. Note that IoT device 10 does not need to include distributed ledger storage 103.

In this manner, IoT device 10 can have digital account 11 and thus, IoT device 10 itself can manage earnings and the like using digital account 11 held by IoT device 10 itself. In other words, without the need for a supervisor, IoT device 10 itself can earn digital currencies and distribute the earned currencies to the owners who are proprietors, for example. Thus, the process of identifying the owner of the IoT device can be eliminated. Accordingly, the amount of processing of the processor can be reduced, and the power consumption can be reduced. Furthermore, it is possible to ensure the transition from a form in which IoT device 10 is purchased and used as in the conventional technique to a new form in which IoT device 10 is shared and used by two or more users on a pay-per-use basis.

[1.2 User 20]

User 20 is a user who has digital account 21 and uses IoT device 10, for example. Using terminal 22, user 20 pays a usage fee charged for use of IoT device 10 from digital account 21 to digital account 11 of IoT device 10. Note that user 20 may be a user who uses IoT device 10 and an owner of IoT device 10 or may be an owner who does not use IoT device 10. When user 20 is an owner of IoT device 10, an amount of allocation of earnings such as the usage fee obtained as a result of IoT device 10 having been used is deposited into digital account 21.

Here, terminal 22 is a terminal including a display unit and an input unit such as a smartphone, a tablet, or a personal computer, for example.

Figure 3:
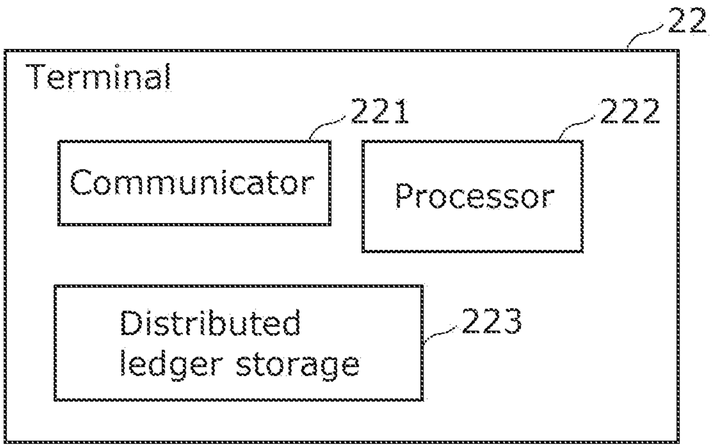
FIG. 3 is a diagram illustrating one example of the configuration of a terminal according to an exemplary embodiment.

FIG. 3 is a diagram illustrating one example of the configuration of terminal 22 according to the present exemplary embodiment.

Terminal 22 is connected to decentralized network 50, can communicate with the plurality of BC nodes 51, and can also communicate with IoT device 10 and the terminal of manufacturer 30 that are connected to decentralized network 50. Terminal 22 has digital account 21 of user 20 on decentralized network 50. Terminal 22 includes: a processor; a memory in which a program for causing the processor to perform a predetermined process is stored; and a communication interface, for example. In other words, terminal 22 functions by the processor performing the predetermined program using the memory.

Terminal device 22 includes communicator 221, processor 222, and distributed ledger storage 223, as illustrated in FIG. 3. Hereinafter, each structural element will be described.

Communicator 221 performs communication with the plurality of BC nodes 51 and performs communication with IoT device 10 and the terminal of manufacturer 30 that are connected to decentralized network 50, for example. In the present exemplary embodiment, communicator 221 transmits and obtains transaction data, for example. There are also cases where communicator 221 obtains a usage fee.

Processor 222 generates transaction data and executes a consensus algorithm for the transaction data among the plurality of BC nodes 51, etc., for example. Furthermore, processor 222 performs the process of writing, into the distributed ledger, the transaction data for which the consensus algorithm has been executed. Processor 222 can execute a smart contract that has been written into the distributed ledger and is operating in the in-memory database.

In the present exemplary embodiment, when the usage fee for IoT device 10 is obtained, processor 222 generates payment transaction data including digital account 11 of IoT device 10, which is a destination of payment for the usage fee, digital account 21 of user 20, which is a source of payment for the usage fee, and tokens indicating the usage fee. Note that when only the identifier of IoT device 10, which is a destination of payment, is known, processor 222 may include, into the payment transaction data, the identifier of IoT device 10, which is a destination of payment, instead of digital account 11. Furthermore, processor 222 may obtain the address indicating the digital account with reference to the association between an identifier and the address of a digital account included in the table recorded in decentralized network 50, and thus include digital account 11 into the payment transaction data.

When user 20 is an owner, processor 222 signs the obtained transaction data according to input from user 20. When user 20 is a user of IoT device 10, processor 222 can also determine the type of tokens to be paid for the usage fee.

Note that when the smart contract is not operated in decentralized network 50, processor 222 reduces corresponding tokens from digital account 21 or adds corresponding tokens to digital account 21, for example.

Distributed ledger storage 223 obtains the latest distributed ledger from BC node 51 and stores the latest distributed ledger into a storage device, for example. A distributed ledger having the same content as the distributed ledger held by BC node 51, for example, is stored in distributed ledger storage 223. Deposits to and withdrawals from digital account 21 are written in this distributed ledger. Note that terminal 22 does not need to include distributed ledger storage 223.

[1.3 Manufacturer 30]

Manufacturer 30 is a company that has digital account 31 and has produced IoT device 10, for example.

The terminal is, for example, a personal computer and is held by manufacturer 30 that has produced IoT device 10. Manufacturer 30 manages digital account 31 using the terminal. Furthermore, manufacturer 30 is a platform provider that, using the terminal, assigns an identifier to IoT device 10 produced or assigns digital account 11 of IoT device 10 to the identifier, for example. The identifier is, for example, the model number, the product number, the serial number, or the license plate of IoT device 10, and may be anything that can uniquely identify IoT device 10. Note that the identifier may include at least one of the model number, the product number, the serial number, and the license plate of IoT device 10.

Note that the configuration of the terminal of manufacturer 30 is substantially the same as the configuration of terminal 22 and therefore, description thereof will be omitted.

[1.4 BC Node 51]

The plurality of BC nodes 51 constitute decentralized network 50, as illustrated in FIG. 1. Each of the plurality of BC nodes 51 is an authentication server including a distributed ledger. The plurality of BC nodes 51 have substantially the same configurations; therefore, one BC node 51 will be described below as an example.

Figure 4:
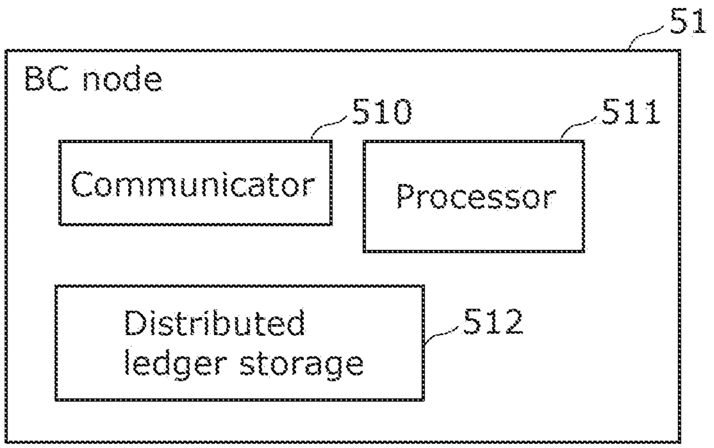
FIG. 4 is a diagram illustrating one example of the configuration of a BC node according to an exemplary embodiment.

FIG. 4 is a diagram illustrating one example of the configuration of BC node 51 according to the present exemplary embodiment.

BC node 51 is connected to decentralized network 50, can communicate with another BC node 51, and can also communicate with IoT device 10, terminal 22 of user 20, the terminal of manufacturer 30, and the like that are connected to decentralized network 50.

BC node 51 includes: a processor; a memory in which a program for causing the processor to perform a predetermined process is stored; and a communication interface, for example. In other words, BC node 51 functions by the processor performing the predetermined program using the memory.

In the present exemplary embodiment, BC node 51 includes communicator 510, processor 511, and distributed ledger storage 512, as illustrated in FIG. 4. Hereinafter, each structural element will be described.

Communicator 510 performs communication with the plurality of BC nodes 51 and performs communication with IoT device 10, terminal 22 of user 20, and the terminal of manufacturer 30 that are connected to decentralized network 50, for example. In the present exemplary embodiment, communicator 510 transmits and obtains transaction data, for example.

Processor 511 generates transaction data and executes a consensus algorithm for the transaction data among the plurality of BC nodes 51, etc., for example. Processor 511 performs the process of writing, into the distributed ledger, the transaction data for which the consensus algorithm has been executed. Furthermore, processor 511 can execute a smart contract that has been written into the distributed ledger and is operating in the in-memory database.

Distributed ledger storage 512 obtains the latest block from another BC node 51, for example, and stores the latest block into a storage device, and thus a distributed ledger having the same content as the distributed ledger held by said other BC node 51 is stored in distributed ledger storage 512. Deposits to and withdrawals from digital account 21 are written in this distributed ledger.

[2 Operation of System 100]

Next, an operation example of system 100 configured as described above will be described.

[2.1 Method for controlling IoT Device 10]

The foregoing has thus far described system 100 that uses decentralized network 50 such as a blockchain, but this is not limiting. Decentralized network 50 is not limited to a blockchain and may be a network that makes a distributed ledger available or may be a commonly-used network including a database. Hereinafter, a method for controlling IoT device 10 will be described as an operation example of system 100.

Figure 5:
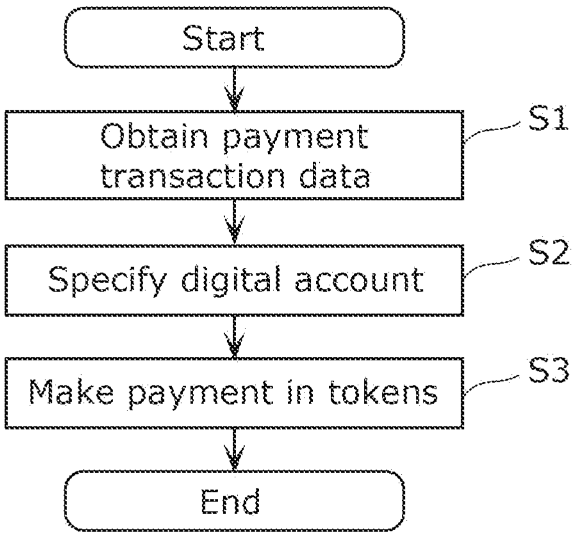
FIG. 5 is a flowchart illustrating one example of an IoT device control method performed by a system according to an exemplary embodiment.

FIG. 5 is a flowchart illustrating one example of the method for controlling IoT device 10 in system 100 according to the present exemplary embodiment. Assume that IoT device 10 has digital account 11 and user 20 who uses IoT device 10 has digital account 21. In this case, first, assume that user 20 uses IoT device 10 and then a usage fee is reported from IoT device 10 to user 20. Using terminal 22 of user 20, user 20 generates payment transaction data for paying the reported usage fee, and transmits the payment transaction data to system 100. This payment transaction data includes: the address of digital account 21 of user 20 that indicates the source of payment; the address of digital account 11 of IoT device 10 that indicates the destination of payment; and tokens indicating the usage fee for IoT device 10. The payment transaction data is one example of the first payment transaction data. System 100 herein is a computer that manages digital account 11 of IoT device 10 and digital account 21 of user 20 that have been opened in decentralized network 50. This computer may be IoT device 10 and terminal 22 of user 20.

System 100 obtains the payment transaction data (S1). More specifically, system 100 obtains payment transaction data for allowing a user who used IoT device 10 to pay the usage fee for IoT device 10 in tokens. In other words, system 100 obtains the first payment transaction data for allowing a user who used the IoT device to transfer the first amount corresponding to the usage amount of the IoT device.

Next, from the payment transaction data obtained in Step S1, system 100 specifies the digital account of IoT device 10 that is associated with the identifier uniquely assigned to the hardware of IoT device 10 (S2). More specifically, from the address indicating the destination of payment included in the payment transaction data obtained in Step S1, system 100 specifies the digital account of IoT device 10 that is associated with the identifier uniquely assigned to the hardware of IoT device 10. The identifier may include at least one of the model number, the product number, the serial number, and the license plate of IoT device 10.

Next, system 100 pays the usage fee for IoT device 10 from digital account 21 of user 20 to digital account 11 of IoT device 10 in tokens (S3). More specifically, on the basis of the payment transaction data obtained in Step S1, system 100 deducts corresponding tokens from digital account 21 of user 20 and adds the corresponding tokens to digital account 11 of IoT device 10. In this manner, system 100 transfers the usage fee for IoT device 10 from digital account 21 of user 20 to digital account 11 of IoT device 10.

The following will describe a specific example of operation of system 100 performed when decentralized network 50 is a blockchain network.

[2.2 Digital Account Opening Process]

Figure 6:
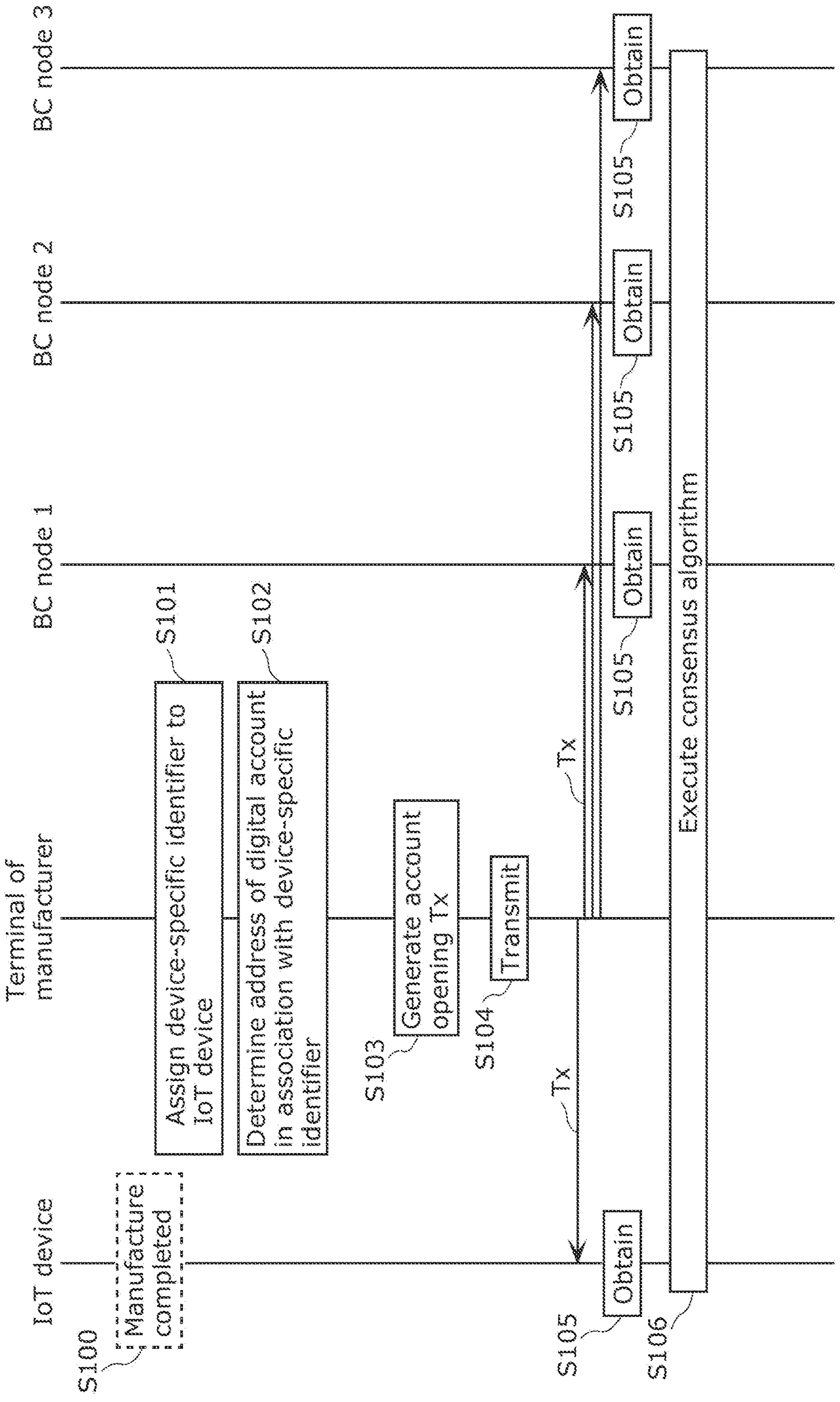
FIG. 6 is a sequence chart illustrating a digital account opening process according to an exemplary embodiment.

FIG. 6 is a sequence chart illustrating a digital account opening process according to the present exemplary embodiment. With reference to the example illustrated in FIG. 6, the processing to be performed in the case where manufacturer 30 opens digital account 11 of IoT device 10 will be described. In FIG. 6, the plurality of BC nodes 51 are indicated as BC nodes 1 to 3; it is assumed in the description that IoT device 10 and the terminal of manufacturer 30 also participate as nodes in decentralized network 50 that is a blockchain.

First, manufacturer 30 manufactures IoT device 10, and assume that the manufacture is completed (S100). IoT device 10 is a home appliance such as a refrigerator or a washing machine, for example, and manufacturer 30 is a company that manufactures and sells the home appliance, for example. Manufacturer 30 may be a platform provider that constructs and manages decentralized network 50.

Next, using a terminal, manufacturer 30 assigns a device-specific identifier to IoT device 10, the manufacture of which has been completed in Step S100 (S101). Manufacturer 30 assigns, to IoT device 10 as the device-specific identifier, an identifier that includes at least one of the model number, the product number, the serial number, and the license plate of IoT device 10 and can be used to uniquely identify the hardware of IoT device 10.

Next, using the terminal, manufacturer 30 determines an address of digital account 11 in association with the device-specific identifier assigned in Step S101 (S102). In the present exemplary embodiment, manufacturer 30 determines a blockchain address of digital account 11 of IoT device 10.

Next, using the terminal, manufacturer 30 generates account opening transaction data which is transaction data for opening digital account 11 of IoT device 10 (S103). The account opening transaction data includes: the identifier of IoT device 10; and the blockchain address of digital account 11 of IoT device 10.

Next, using the terminal, manufacturer 30 transmits, to IoT device 10 and BC nodes 1 to 3, the account opening transaction data generated in Step S103 (S104).

Next, when IoT device 10 and BC nodes 1 to 3 obtain the account opening transaction data from the terminal of manufacturer 30 (S105), the terminal of manufacturer 30, IoT device 10, and BC nodes 1 to 3 execute a consensus algorithm (S106).

In this manner, the terminal of manufacturer 30, IoT device 10, and BC nodes 1 to 3 execute the consensus algorithm, thus generate a block including the account opening transaction data, and record the block into the distributed ledger. Note that the account opening transaction data does not need to be transmitted to IoT device 10. In this case, the consensus algorithm is executed without IoT device 10. Accordingly, IoT device 10 can omit the process related to the consensus algorithm, and thus the amount of processing of the processor can be reduced. Furthermore, IoT device 10 does not store the distributed ledger into the memory, and thus the memory consumption can be reduced. This allows for a reduction in the power consumption of IoT device 10.

In this manner, the block including the account opening transaction data is recorded into the distributed ledger in decentralized network 50, and digital account 11 of IoT device 10 is opened.

Note that when decentralized network 50 is not a blockchain network, it is sufficient that in Step S103, manufacturer 30 generate, using the terminal, information showing the association between the identifier of IoT device 10 and the address of IoT device 10. Subsequently, in Step S104, manufacturer 30 causes the terminal to transmit the generated information to a database included in decentralized network 50 and causes the database to store the generated information. Thus, using the address accessible on the network, IoT device 10 can have a digital account.

In this manner, system 100 allows IoT device 10 to have digital account 11 using the address accessible on decentralized network 50. With this, IoT device 10 itself is allowed to manage earnings such as the usage fee. Furthermore, when digital account 11 of IoT device 10 is managed on the blockchain, IoT device 10 itself can manage earnings such as the usage fee using digital account 11 having traceability and tamper-proof features.

Note that the foregoing indicates that using the terminal, manufacturer 30 assigns an identifier to IoT device 10 and determines an address of digital account 11 of IoT device 10, but this is not limiting. Any of BC nodes 1 to 3 may assign an identifier to IoT device 10 and determine an address of digital account 11 of IoT device 10. This will be described below with reference to FIG. 7.

Figure 7:
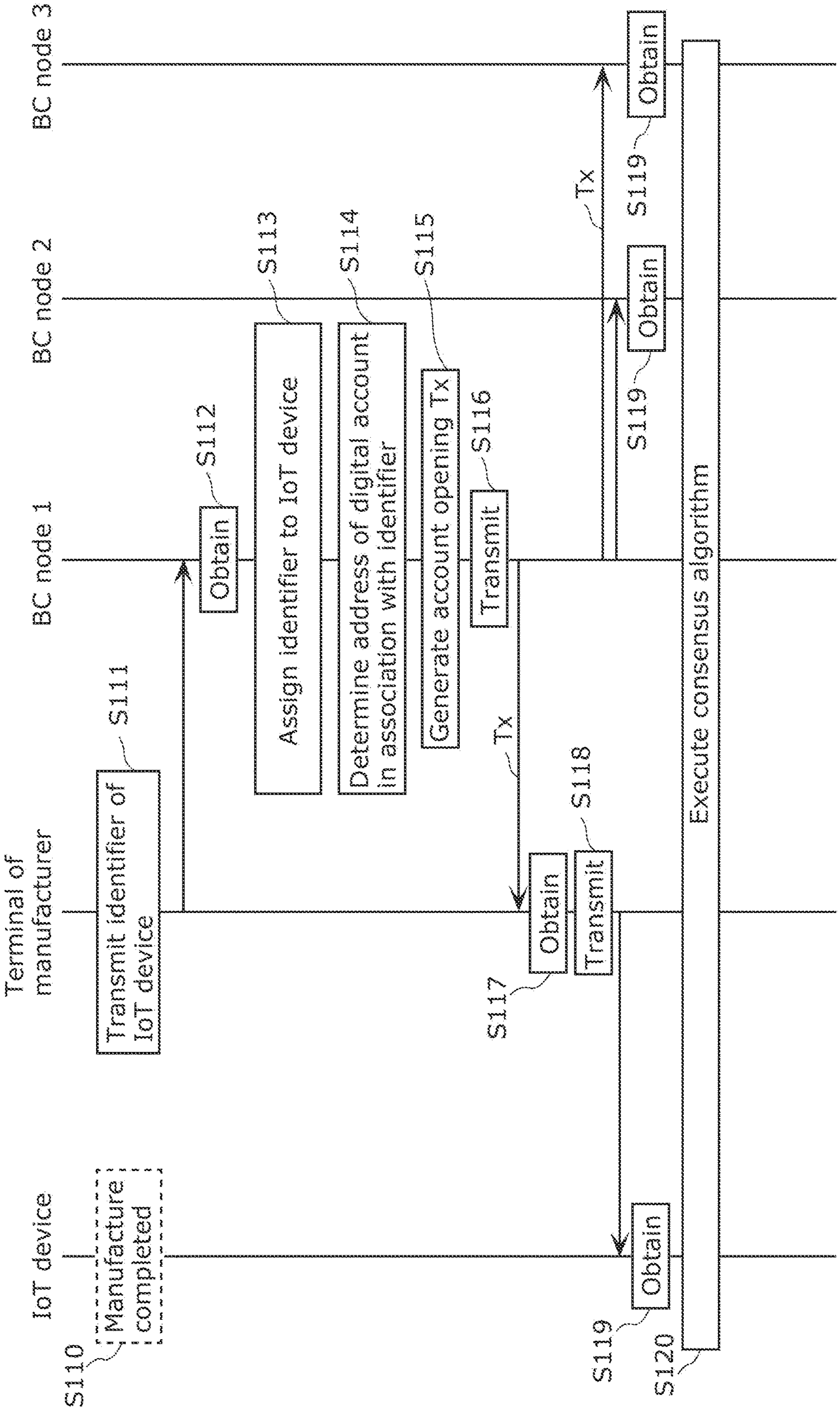
FIG. 7 is another sequence chart illustrating a digital account opening process according to an exemplary embodiment.

FIG. 7 is another sequence chart illustrating a digital account opening process according to the present exemplary embodiment.

First, manufacturer 30 manufactures IoT device 10, and assume that the manufacture is completed (S110).

Next, manufacturer 30 confirms the identifier of IoT device 10, the manufacture of which has been completed in Step S110, and transmits the identifier to BC node 1 using the terminal of manufacturer 30 (S111). More specifically, manufacturer 30 transmits, to BC node 1 as the identifier of IoT device 10, an identifier such as the model number, the product number, the serial number, and the license plate of IoT device 10 that can be used to uniquely identify the hardware of IoT device 10. Note that the node to which the identifier is to be transmitted is not limited to BC node 1; the identifier may be transmitted to other BC nodes 2, 3.

Next, when BC node 1 obtains the identifier transmitted from the terminal of manufacturer 30 (S112), BC node 1 assigns an identifier to IoT device 10, the manufacture of which has been completed in Step S110 (S113).

Next, BC node 1 determines an address of digital account 11 in association with the identifier assigned in Step S113 (S114). In the present exemplary embodiment, BC node 1 determines a blockchain address of digital account 11 of IoT device 10.

Next, BC node 1 generates account opening transaction data which is transaction data for opening digital account 11 of IoT device (S115). The account opening transaction data includes: the identifier of IoT device 10; and the blockchain address of digital account 11 of IoT device 10, as mentioned above.

Next, BC node 1 transmits, to the terminal of manufacturer 30 and other BC nodes 2, 3, the account opening transaction data generated in Step S115 (S116).

Next, when the terminal of manufacturer 30 obtains the account opening transaction data from BC node 1 (S117), the terminal of manufacturer 30 transmits the obtained account opening transaction data to IoT device 10 (S118).

Next, when IoT device 10 and BC nodes 2, 3 obtain the account opening transaction data (S119), IoT device 10, the terminal of manufacturer 30, and BC nodes 2, 3 execute a consensus algorithm (S120). Note that the account opening transaction data does not need to be transmitted to IoT device 10. In this case, the consensus algorithm is executed without IoT device 10. Accordingly, IoT device can omit the process related to the consensus algorithm, and thus the amount of processing of the processor can be reduced. Furthermore, IoT device 10 does not store the distributed ledger into the memory, and thus the memory consumption can be reduced. This allows for a reduction in the power consumption of IoT device 10.

In this manner, the block including the account opening transaction data is recorded into the distributed ledger in decentralized network 50, and digital account 11 of IoT device 10 is opened.

[2.3 Usage Fee Deposit Process]

Figure 8:
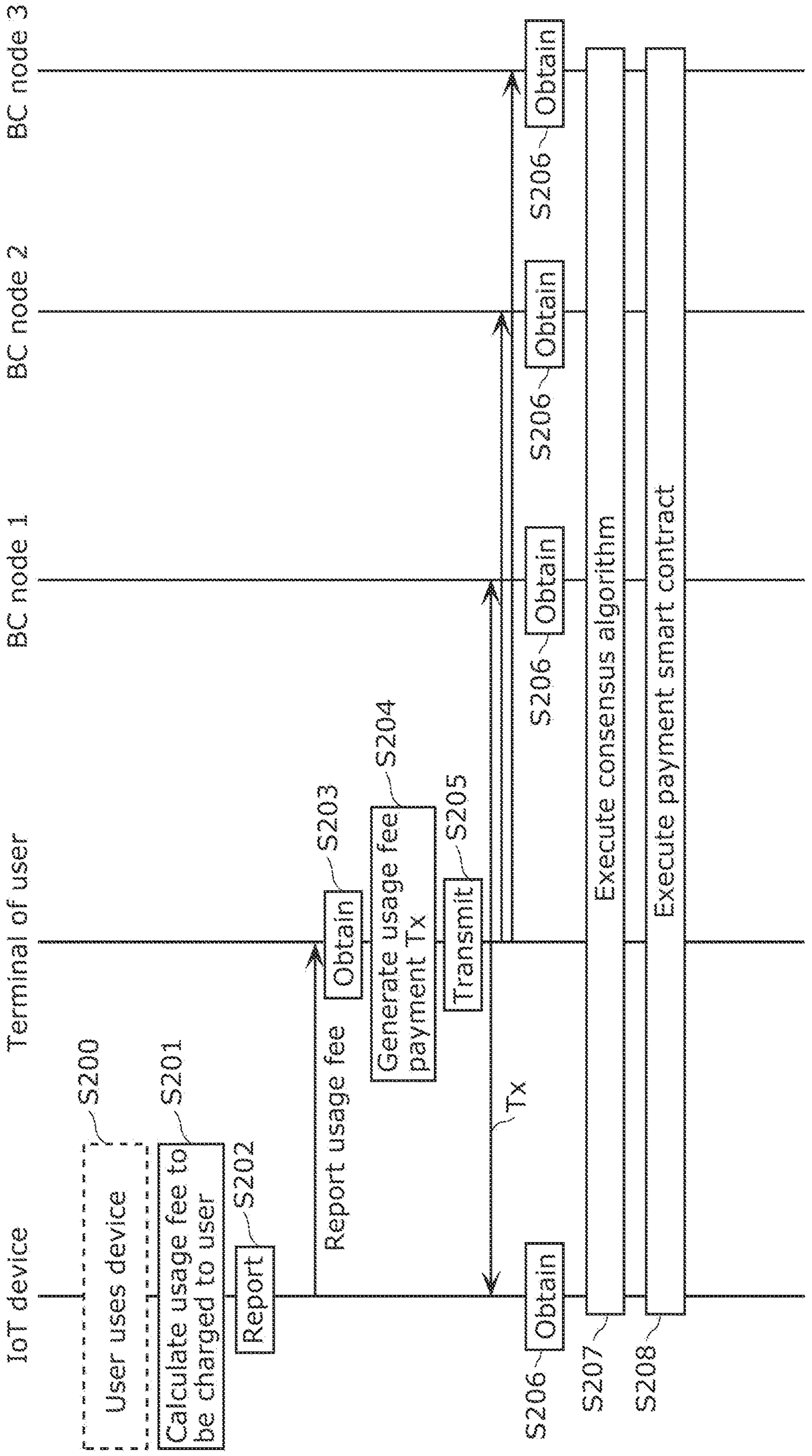
FIG. 8 is a sequence chart illustrating a usage fee deposit process according to an exemplary embodiment.

FIG. 8 is a sequence chart illustrating a usage fee deposit process according to the present exemplary embodiment. With reference to the example illustrated in FIG. 8, the processing to be performed in the case where the usage fee for IoT device 10 used by user 20 is deposited into digital account 11 of IoT device 10. In FIG. 8, similar to FIG. 6 and FIG. 7, the plurality of BC nodes 51 are indicated as BC nodes 1 to 3; it is assumed in the description that IoT device 10 and terminal 22 of user 20 also participate as nodes in decentralized network 50 that is a blockchain.

First, assume that user 20 used IoT device 10 (S200). IoT device 10 is a home appliance such as a refrigerator or a washing machine, for example, and user 20 may be a person who shares a room and uses IoT device 10 that is shared or may be person who uses IoT device 10 on a pay-per-use basis.

Next, IoT device 10 calculates a usage fee to be charged to user 20 (S201). By referring to a fee table held in IoT device 10 or referring to a fee table via a network, IoT device 10 can calculate a usage fee corresponding to how user 20 used IoT device 10.

Next, IoT device 10 reports the usage fee calculated in Step S201 to terminal 22 of user 20 (S202).

Next, when terminal 22 of user 20 obtains the usage fee reported from IoT device 10 (S203), terminal 22 of user 20 generates usage fee payment transaction data which is transaction data for paying the usage fee for IoT device 10 (S204). The usage fee payment transaction data is one example of the first payment transaction data. The usage fee payment transaction data includes: the address of digital account 21 of user 20 that indicates the source of payment; the address of digital account 11 of IoT device 10 that indicates the destination of payment; and tokens (an amount of tokens) indicating the usage fee for IoT device 10.

Next, terminal 22 of user 20 transmits, to IoT device 10 and BC nodes 1 to 3, the usage fee payment transaction data generated in Step S204 (S205).

Next, when IoT device 10 and BC nodes 1 to 3 obtain the usage fee payment transaction data from terminal 22 of user 20 (S206), IoT device 10, terminal 22 of user 20, and BC nodes 1 to 3 execute a consensus algorithm (S207).

In this manner, IoT device 10, terminal 22 of user 20, and BC nodes 1 to 3 execute the consensus algorithm, thus generate a block including the usage fee payment transaction data, and record the block into the distributed ledger.

Next, IoT device 10, terminal 22 of user 20, and BC nodes 1 to 3 execute the payment smart contract recorded in the distributed ledger (S208). More specifically, in Step S207, when the payment transaction data generated in Step S204 is recorded into the distributed ledger, in other words, stored into the blockchain, it is possible to operate the smart contract that is managed on the blockchain. The payment smart contract that is executed in Step S208 is programmed so as to enable payment (depositing) of the usage fee from the digital account of the source of payment to the digital account of the destination of payment. This payment smart contract is made executable on a working memory when recorded in the distributed ledger. Subsequently, when the payment smart contract is operated, tokens indicating the usage fee can be transferred from digital account 21 of user 20 to digital account 11 of IoT device 10. In this manner, using the payment smart contract, system 100 makes it possible to automatically transfer earnings to digital account 11 of IoT device 10 in tokens.

Note that in the above description of the example illustrated in FIG. 8, terminal 22 of user 20 generates the usage fee payment transaction data, but this is not limiting. IoT device 10 may generate payment transaction data for the usage fee calculated in Step S201. More specifically, it is sufficient that the reporting process in Step S202 and the obtaining process in Step S203 be skipped and in Step S204 and Step S205, IoT device 10 generate payment transaction data for the usage fee calculated in Step S201 and transmit the payment transaction data to BC nodes 1 to 3 and terminal 22 of user 20. Note that the generation of the payment transaction data by IoT device 10 may be represented as "the obtainment of the payment transaction data by IoT device 10".

Figure 9:
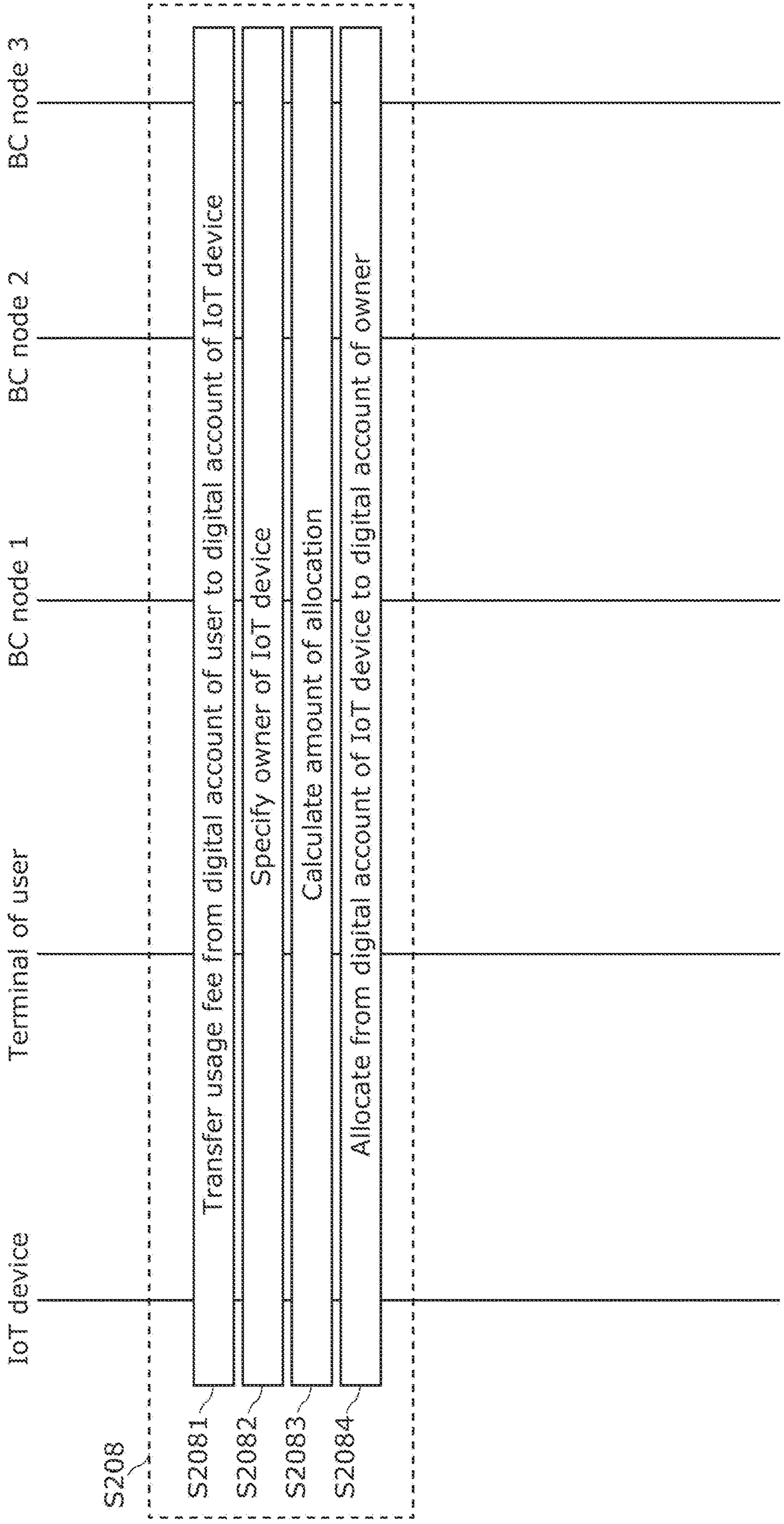
FIG. 9 is a sequence chart illustrating one example of a detailed process of Step S208 illustrated in FIG. 8.

FIG. 9 is a sequence chart illustrating one example of a detailed process of Step S208 illustrated in FIG. 8.

In Step S208, the payment smart contract transfers the usage fee from digital account 21 of user 20 to digital account 11 of IoT device 10 in tokens (S2081). In the present exemplary embodiment, the payment smart contract deposits the usage fee into digital account 11 of IoT device 10 in tokens according to the blockchain addresses indicating the source of payment and the destination of payment and the amount of tokens indicating the usage fee that are included in the payment transaction data generated in Step S204.

Next, the payment smart contract specifies the owners of IoT device 10 (S2082) and calculates an amount of allocation (S2083). For example, the payment smart contract may specify the owners of IoT device 10 and the amount of allocation by referring to a table such as that illustrated in FIG. 10 using the address of the digital account of IoT device 10 included in the payment transaction data generated in Step S204.

FIG. 10 is one example of a table for managing IoT device 10, owners, and allocation according to the present exemplary embodiment. The table illustrated in FIG. 10 includes: the association between the identifier of IoT device 10 and the address of the digital account of IoT device 10; two owners of said IoT device 10; and the identifiers of the terminals of the owners and the addresses of the digital accounts of the owners. Furthermore, the table illustrated in FIG. 10 includes the allocation percentages of the two owners of IoT device 10.

To describe using the example illustrated in FIG. 10, the payment smart contract specifies the addresses of the digital accounts of the two owners of IoT device 10 and calculates an amount of allocation as half the usage fee deposited in Step S2081 because the allocation percentages are 50%.

Next, the payment smart contract allocates the usage fee from digital account 11 of IoT device 10 to the digital accounts of the owners (S2084). In the example illustrated in FIG. 10, the payment smart contract allocates half the usage fee from digital account 11 of IoT device 10 to each of the digital accounts of the two owners and deposits half the usage fee into each of said digital accounts.

In this manner, the payment smart contract can allocate, to the digital accounts of the one or more owners specified, the tokens transferred to digital account 11 of IoT device 10. Thus, when one payment smart contract is operated, it is possible to transfer the usage fee in tokens to digital account 11 of IoT device 10 and allocate the amount of allocation to the digital account of the owner, meaning that the process of generating transaction data for transferring the usage fee in tokens or generating transaction data for allocating the amount of allocation to the digital account of the owner can be eliminated. Accordingly, the amount of processing of the processor can be reduced, and the power consumption of IoT device 10 can be reduced. This allows the transition from a form in which IoT device 10 is purchased and used as in the conventional technique to a new form in which IoT device 10 is owned by two or more users who can be replaced and profit obtained by IoT device 10 is distributed to the two or more users who own IoT device 10.

Note that in the above description of the example illustrated in FIG. 9, one payment smart contract is operated and thus, the usage fee in tokens is transferred to digital account 11 of IoT device 10 and an amount of allocation is allocated to the digital account of each owner, but this is not limiting. The smart contract for transferring the usage fee in tokens to digital account 11 of IoT device 10 and the smart contract for allocating the amount of allocation to the digital account of each owner may be different smart contracts. This will be described with reference to FIG. 11.

Figure 11:
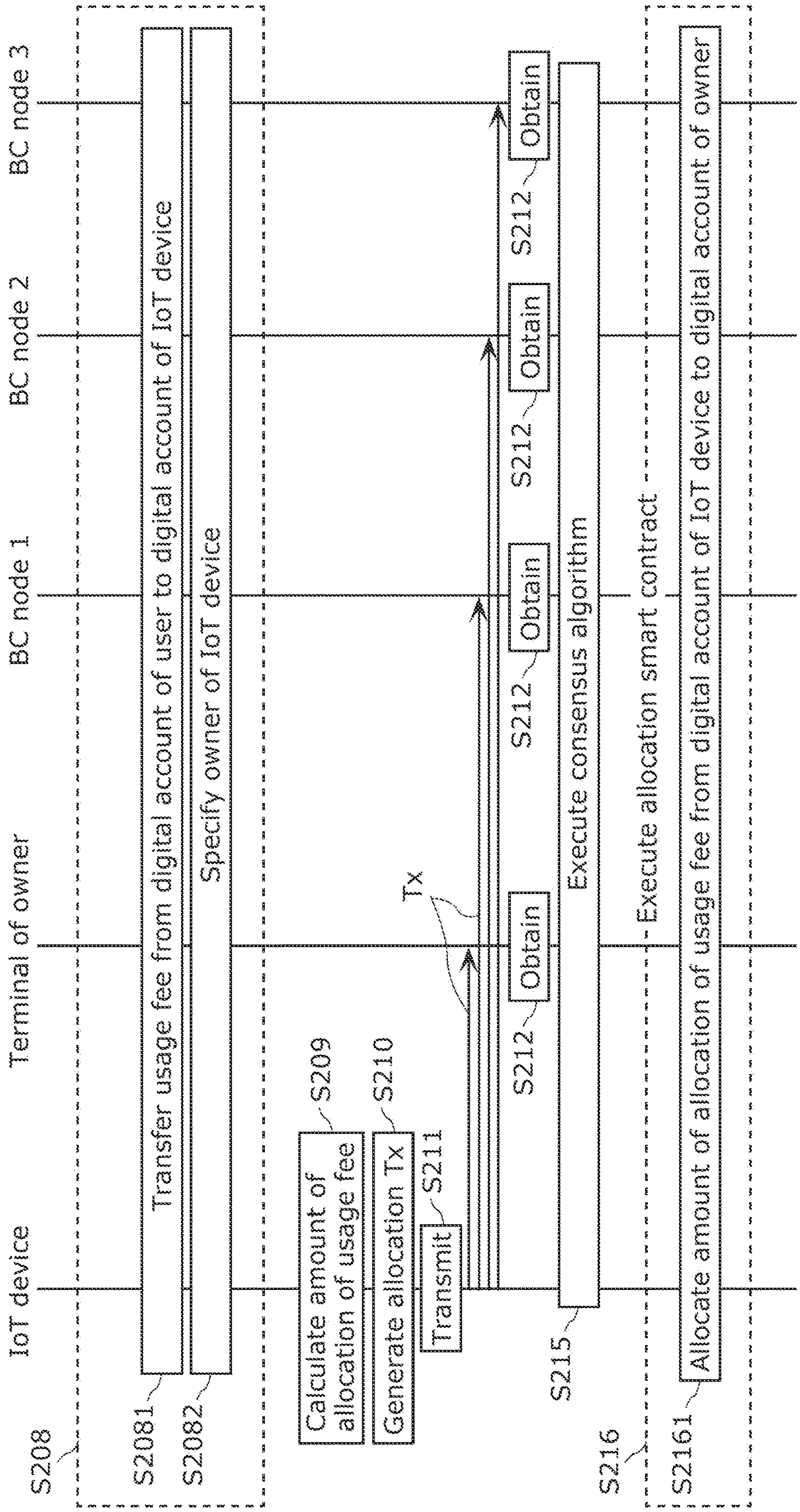
FIG. 11 is a sequence chart illustrating another example of processes subsequent to Step S208 illustrated in FIG. 8.

FIG. 11 is a sequence chart illustrating another example of processes subsequent to Step S208 illustrated in FIG. 8. With reference to FIG. 11, the following description will assume that IoT device 10 and the terminal of the owner also participate as nodes in decentralized network 50 that is a blockchain. Note that the configuration of the terminal of the owner is substantially the same as the configuration of terminal 22.

In Step S208, the payment smart contract transfers the usage fee from digital account 21 of user 20 to digital account 11 of IoT device 10 in tokens (S2081). In the present exemplary embodiment, the payment smart contract deposits the usage fee into digital account 11 of IoT device 10 in tokens according to the blockchain addresses indicating the source of payment and the destination of payment and the amount of tokens indicating the usage fee that are included in the payment transaction data generated in Step S204.

Next, the payment smart contract specifies the owner of IoT device 10 (S2082). For example, the payment smart contract specifies the owner of IoT device 10 by referring to a table such as that illustrated in FIG. 10 using the address of the digital account of IoT device 10 included in the payment transaction data generated in Step S204.

Next, IoT device 10 calculates an amount of allocation of the usage fee deposited into digital account 11 (S209). By referring to a table such as that illustrated in FIG. 10, IoT device 10 can calculates, as the amount of allocation, half the usage fee deposited into digital account 11.

Next, IoT device 10 generates allocation transaction data which is transaction data for allocating, to the owners, the amount of allocation calculated in Step S209 (S210). The allocation transaction data includes: the address of digital account 11 of IoT device 10 that indicates the source of allocation (the source of payment); the address of the digital account of the owner that indicates the destination of allocation (the destination of payment); and tokens indicating the amount of allocation.

Next, IoT device 10 transmits the allocation transaction data generated in Step S210 to the terminal of the owner and BC nodes 1 to 3 (S211).

Next, when the terminal of the owner and BC nodes 1 to 3 obtain the allocation transaction data from IoT device 10 (S212), IoT device 10, the terminal of the owner, and BC nodes 1 to 3 execute a consensus algorithm (S215).

In this manner, IoT device 10, the terminal of the owner, and BC nodes 1 to 3 execute the consensus algorithm, thus generate a block including the allocation transaction data, and record the block into the distributed ledger.

Next, IoT device 10, the terminal of the owner, and BC nodes 1 to 3 execute the allocation smart contract recorded in the distributed ledger (S216). More specifically, in Step S216, when the allocation transaction data generated in Step S210 is recorded into the distributed ledger, in other words, stored into the blockchain, it is possible to operate the smart contract that is managed on the blockchain. The allocation smart contract that is executed in Step S216 is programmed so as to enable payment (depositing) of the amount of allocation of the usage fee from the digital account of the source of allocation to the digital account of the destination of allocation. This allocation smart contract is made executable on a working memory when recorded in the distributed ledger. Subsequently, when the allocation smart contract is operated, tokens that are the usage fee transferred to digital account 11 of IoT device 10 can be allocated to the digital accounts of one or more owners specified (S2161). In this manner, using the allocation smart contract, system 100 enables automatic allocation of profit obtained by IoT device 10. In other words, using the allocation smart contract, system 100 can automatically allocate, to the owners, the earnings deposited into digital account 11 of IoT device 10.

Note that in the above description, IoT device 10 calculates the amount of allocation and generates the allocation transaction data, but this is not limiting. IoT device 10 may make an allocation amount calculation request to one of BC nodes 1 to 3 to generate the allocation transaction data. Furthermore, the calculation request may be made by generating request transaction data for making a calculation request that includes the address of the digital account of IoT device 10 and the amount of tokens indicating the usage fee. Accordingly, IoT device 10 can omit the calculation of the amount of allocation, thus the amount of processing of the processor can be reduced, and the power consumption of IoT device 10 can be reduced.

[2.4 Log Data Purchase Amount Deposit Process]

Figure 12:
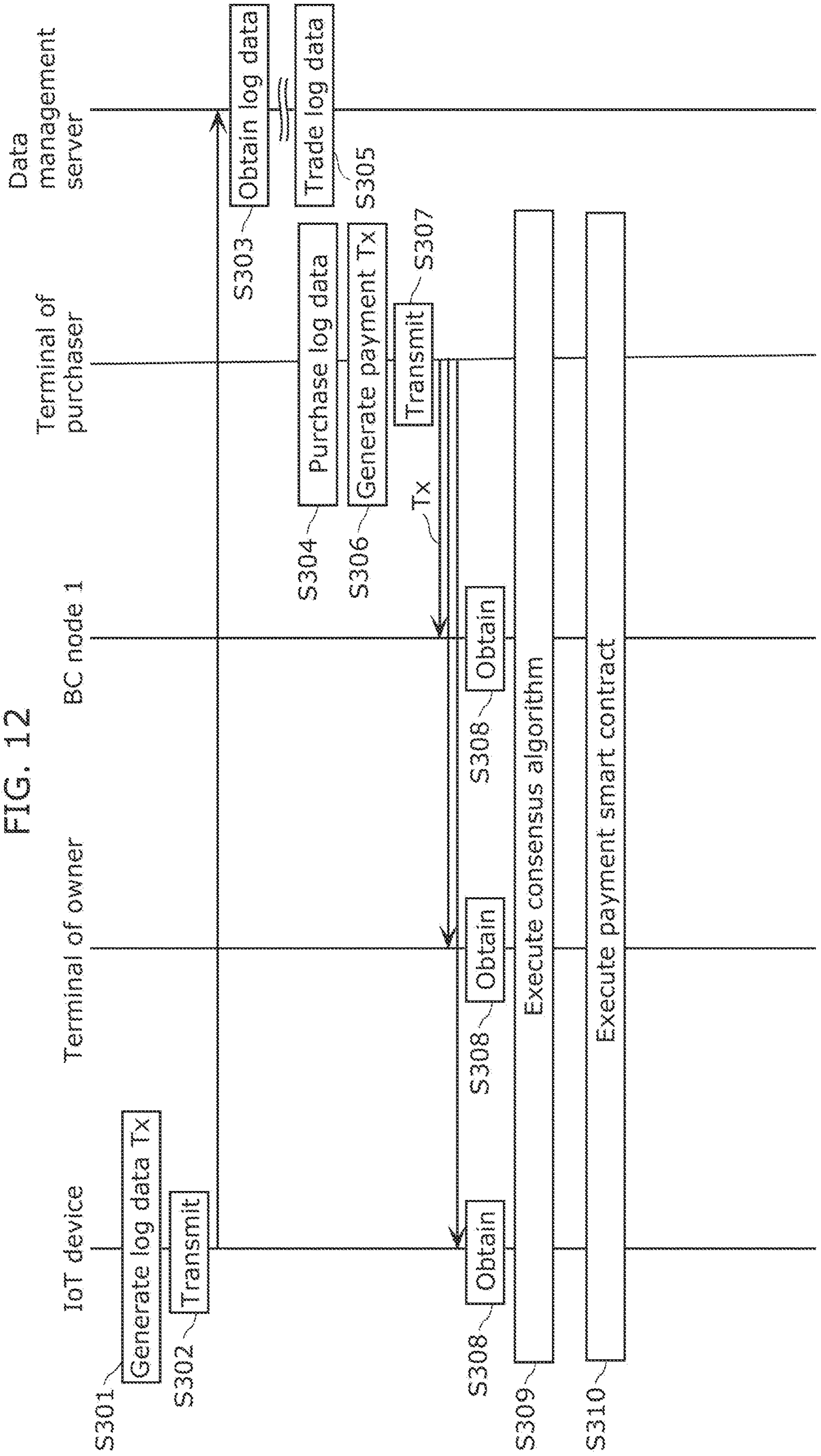
FIG. 12 is a sequence chart illustrating a log data purchase amount deposit process according to an exemplary embodiment.

FIG. 12 is a sequence chart illustrating a log data purchase amount deposit process according to the present exemplary embodiment. With reference to the example illustrated in FIG. 12, the processing to be performed in the case where a log data purchase amount charged to a purchaser who purchases log data of IoT device 10 is deposited into digital account 11 of IoT device 10 will be described. In FIG. 12, the plurality of BC nodes 51 are indicated as BC node 1; it is assumed in the description that IoT device 10, the terminal of the owner, and the terminal of the purchaser also participate as nodes in decentralized network 50 that is a blockchain. Note that the configurations of the terminal of the owner and the terminal of the purchaser are substantially the same as the configuration of terminal 22. Note that with reference to FIG. 12, the log data purchase amount deposit process to be performed in the case where a purchaser purchases the log data of IoT device 10 will be described as a deposit process related the log data of IoT device 10, but this is not limiting. The deposit process related the log data of IoT device 10 may be a browsing fee deposit process, a usage fee deposit process, or a secondary use deposit process for the log data of IoT device 10.

First, assume that IoT device 10 registers log data into a data management server at regular intervals. Specifically, IoT device 10 generates log data transaction data which is transaction data including the log data (S301) and transmits the log data transaction data to the data management server (S302). Next, the data management server obtains the log data transaction data (S303) and stores, into a storage device for storing the log data, the log data of IoT device 10 included in the log data transaction data. The data management server is located outside of decentralized network 50 and is accessible from IoT device 10 and the terminal of the purchaser via a network.

Assume that there is a purchaser who purchases the log data of IoT device 10; the purchaser uses a terminal to purchase the log data of IoT device 10 from the data management server (S304). The data management server makes a log data trade by selling the log data of IoT device 10 (transmitting the log data) to the purchaser and reporting a log data purchase amount (S305).

Next, using the terminal, the purchaser generates purchase amount payment transaction data which is transaction data for paying the log data purchase amount (S306). The purchase amount payment transaction data, which is one example of the second payment transaction data, is transaction data for allowing a user who has purchased the log data of IoT device 10 to pay the purchase amount of the log data to the digital account of IoT device 10 in tokens. The purchase amount payment transaction data includes: the address of the digital account of the purchaser that indicates the source of payment (the purchaser); the address of digital account 11 of IoT device 10 that indicates the destination of payment; and the amount of tokens indicating the purchase amount of the log data of IoT device 10. The purchase amount of the log data is one example of the second amount.

Next, using the terminal, the purchaser transmits, to IoT device 10, the terminal of the owner, and BC node 1, the purchase amount payment transaction data generated in Step S304 (S307).

Next, when IoT device 10, the terminal of the owner, and BC node 1 obtain the purchase amount payment transaction data from the terminal of the purchaser (S308), IoT device 10, the terminal of the owner, the terminal of the purchaser, and BC node 1 execute a consensus algorithm (S309).

In this manner, IoT device 10, the terminal of the owner, the terminal of the purchaser, and BC node 1 execute the consensus algorithm, thus generate a block including the purchase amount payment transaction data, and record the block into the distributed ledger.

Next, IoT device 10, the terminal of the owner, the terminal of the purchaser, and BC node 1 execute the payment smart contract recorded in the distributed ledger (S310). More specifically, in Step S309, when the payment transaction data generated in Step S306 is recorded into the distributed ledger, in other words, stored into the blockchain, it is possible to operate the smart contract that is managed on the blockchain. The payment smart contract that is executed in Step S310 is programmed so as to enable payment (depositing) of the purchase amount from the digital account of the source of payment to the digital account of the destination of payment. This payment smart contract is made executable on a working memory when recorded in the distributed ledger When this payment smart contract is operated, digital account 11 of IoT device 10 is specified from the payment transaction data, and tokens that are the purchase amount are deducted from the digital account of the purchaser and added to digital account 11 of IoT device 10. In this manner, when the payment smart contract is operated, the purchase amount of the log data can be transferred to the digital account of IoT device 10 in tokens. Thus, IoT device 10 itself is allowed to manage earnings including the purchase amount of the log data.

Note that the payment smart contract that is executed in Step S310 may not only transfer the purchase amount of the log data to the digital account of IoT device 10, but also allocate the amount of allocation to the owner.

Figure 13:
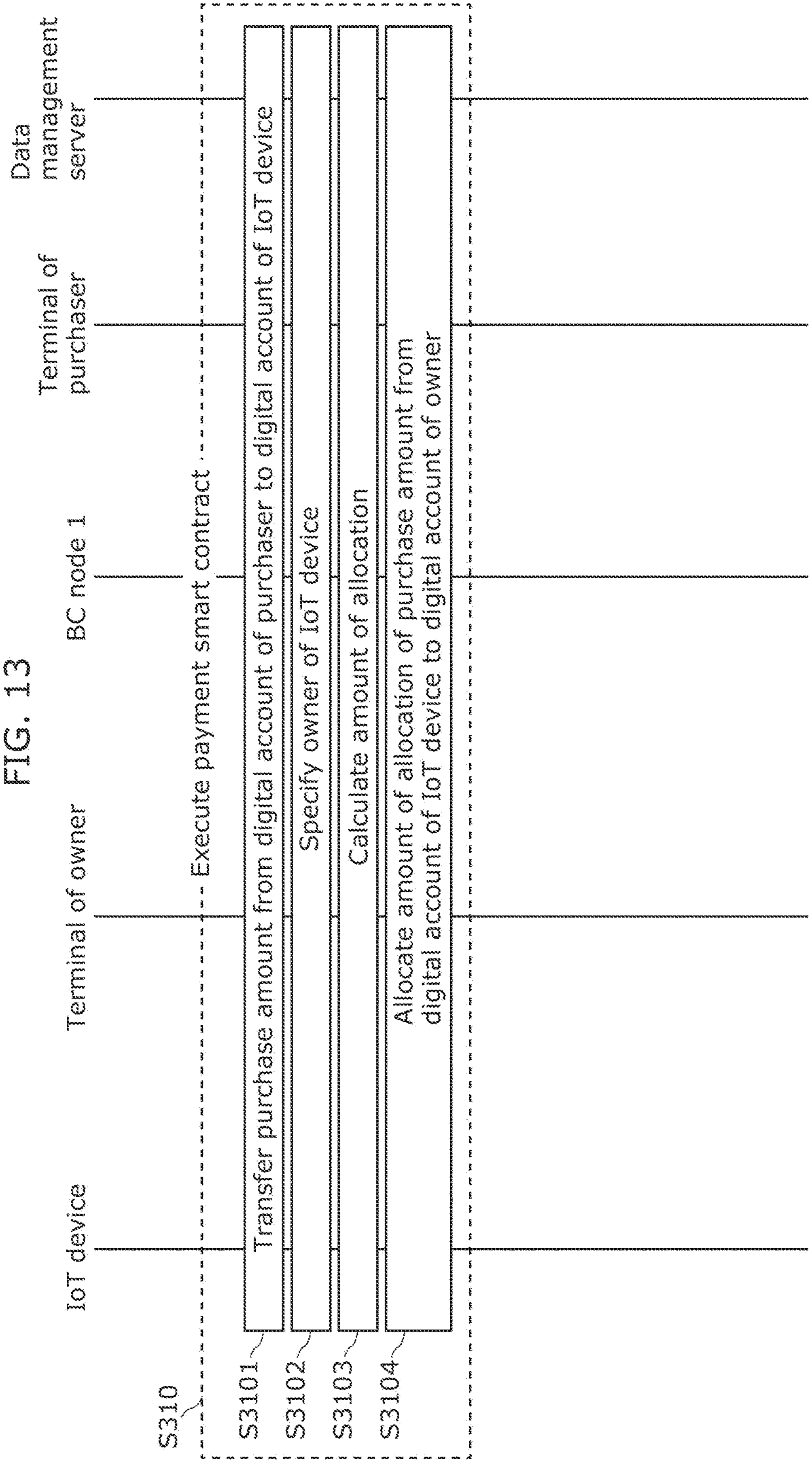
FIG. 13 is a sequence chart illustrating another example of a detailed process of Step S310 illustrated in FIG. 12.

FIG. 13 is a sequence chart illustrating another example of a detailed process of Step S310 illustrated in FIG. 12.

In Step S310, the payment smart contract transfers the purchase amount of the log data from the digital account of the purchaser to digital account 11 of IoT device 10 in tokens (S3101). In the present exemplary embodiment, the payment smart contract deposits the purchase amount into digital account 11 of IoT device 10 in tokens according to the source of payment, the destination of payment, and the purchase amount of the log data that are included in the payment transaction data generated in Step S306.

Next, the payment smart contract specifies the owners of IoT device 10 (S3102) and calculates an amount of allocation (S3103). For example, by referring to a table such as that illustrated in FIG. 10, the payment smart contract can determine the owners of IoT device 10 and the amount of allocation using the address of digital account 11 of IoT device 10 included in the payment transaction data generated in Step S306.

Next, the payment smart contract allocates the purchase amount of the log data from digital account 11 of IoT device 10 to the digital accounts of the owners (S3104). In the example illustrated in FIG. 10, the payment smart contract allocates half the purchase amount of the log data from digital account 11 of IoT device 10 to each of the digital accounts of the two owners and deposits half the purchase amount of the log data into each of said digital accounts.

In this manner, the payment smart contract can allocate, to the digital accounts of the one or more owners specified, the tokens transferred to digital account 11 of IoT device 10.

[2.5 Variation of Deposit Process]

The above description assumes that the tokens transferred to digital account 11 of IoT device 10 and the tokens included in the digital account of a person who pays the usage fee or the purchase amount are the same, but this is not limiting.

Figure 14:
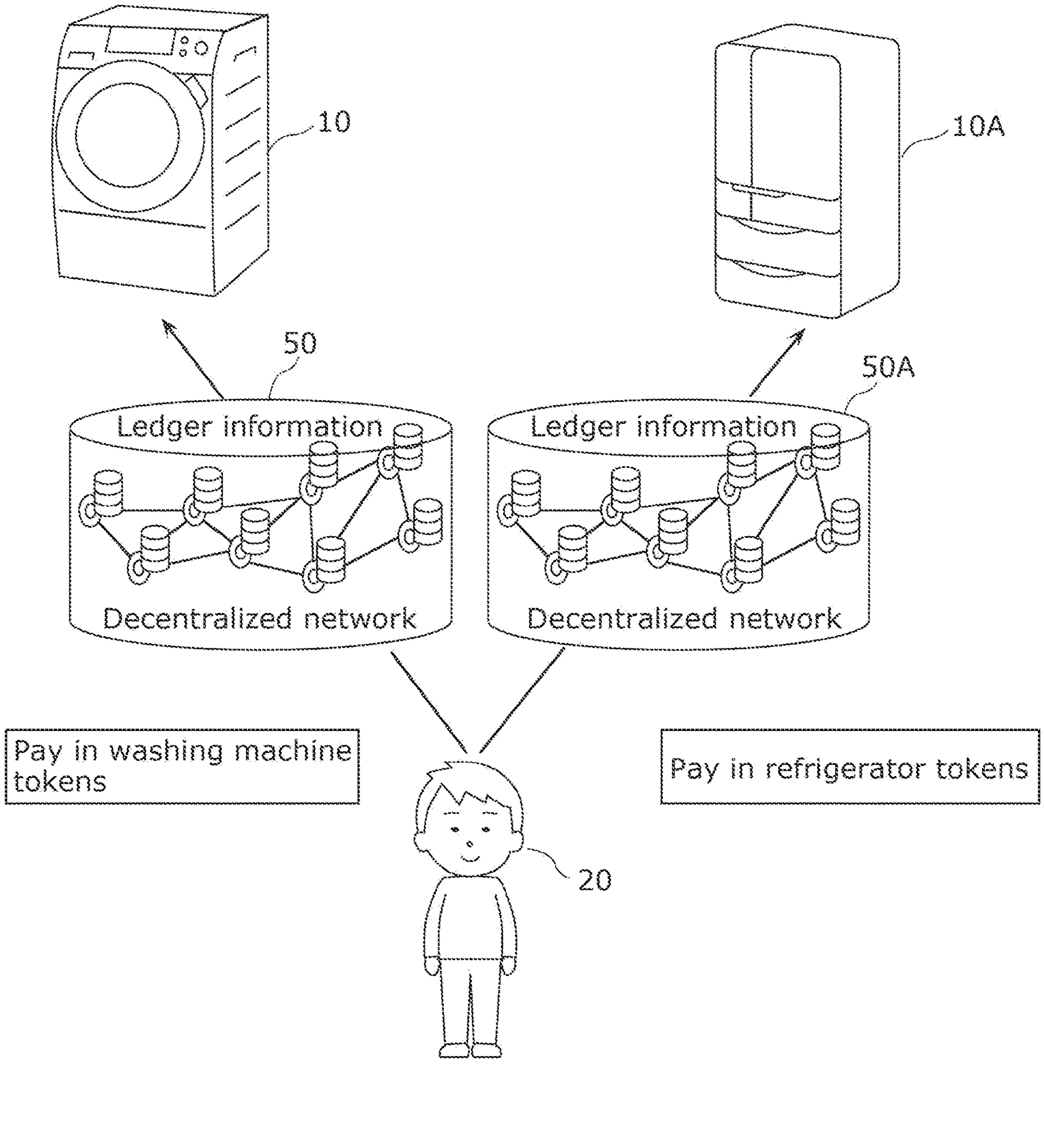
FIG. 14 is a diagram for describing tokens usable for payment being different for each type of IoT devices according to an exemplary embodiment.

FIG. 14 is a diagram for describing tokens usable for payment being different for each type of IoT devices 10 according to the present exemplary embodiment.

In the example illustrated in FIG. 14, IoT device 10 that is a washing machine, for example, and IoT device 10A that is a refrigerator, for example, respectively belong to decentralized network 50 and decentralized network 50A which are different. Furthermore, the example illustrated in FIG. 14 shows that when user 20 uses IoT device 10 that is a washing machine, for example, payment to digital account 11 of IoT device 10 needs to be made in washing machine tokens. Similarly, when user 20 uses IoT device 10A that is a refrigerator, for example, payment to digital account 11 of IoT device 10A needs to be made in refrigerator tokens. The washing machine tokens and the refrigerator tokens are different tokens.

Figure 15:
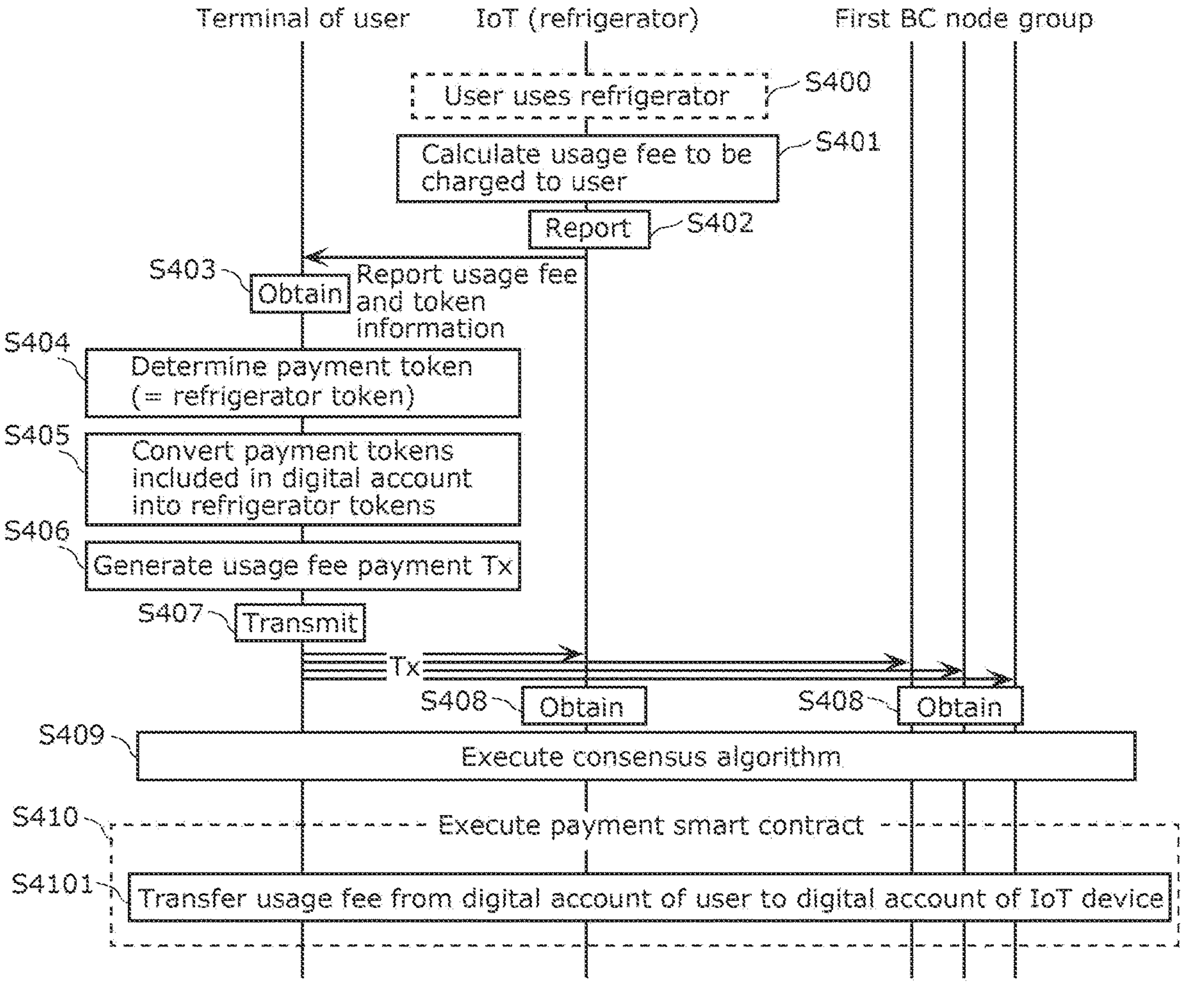
FIG. 15 is a sequence chart illustrating a variation of a usage fee deposit process according to an exemplary embodiment.

FIG. 15 is a sequence chart illustrating a variation of a usage fee deposit process according to the present exemplary embodiment. With reference to the example illustrated in FIG. 15, the processing to be performed in the case where the usage fee for IoT device 10A that is a refrigerator used by user 20 is deposited into digital account 11 of IoT device 10A in refrigerator tokens will be described. In FIG. 15, the plurality of BC nodes 51 are indicated as a first BC node group capable of handling only the refrigerator tokens as tokens that can be deposited into the digital accounts; it is assumed in the description that IoT device 10A that is a refrigerator and terminal 22 of user 20 also participate as nodes in decentralized network 50 that is a blockchain. The description will be made assuming that tokens included in digital account 21 of user 20 are key tokens that are different from the refrigerator tokens.

First, assume that user 20 uses IoT device 10A that is a refrigerator (S400).

IoT device 10A that is a refrigerator calculates a usage fee to be charged to user 20 in refrigerator tokens (S401). By referring to a fee table held in IoT device 10A or referring to a fee table via a network, IoT device 10A can calculate a usage fee corresponding to how user 20 used IoT device 10A.

Next, IoT device 10A reports the usage fee calculated in Step S401 to terminal 22 of user 20 (S402). In the example illustrated in FIG. 15, IoT device 10A reports, to terminal 22 of user 20, the usage fee calculated in Step S401 and token information indicating that tokens for paying the usage fee are refrigerator tokens.

Next, when terminal 22 of user 20 obtains the usage-fee-related information reported from IoT device 10A (S403), terminal 22 determines payment tokens that are tokens to be used to pay the usage fee for IoT device 10A (S404). In the example illustrated in FIG. 15, terminal 22 determines that the payment tokens are refrigerator tokens.

Next, terminal 22 of user 20 converts a payment amount of tokens included in digital account 21 of user 20 into refrigerator tokens (S405). Specifically, terminal 22 of user 20 generates exchange transaction data for requesting an intermediary server not illustrated in the drawings to exchange the payment amount of tokens included in digital account 21 of user 20, and transmits the exchange transaction data to the intermediary server. The exchange transaction data includes: an amount of key tokens that corresponds to the usage fee; and information indicating a request to exchange the key tokens for refrigerator tokens. When the intermediary server obtains the exchange transaction data, the intermediary server generates exchange-completion transaction data including an amount of refrigerator tokens obtained by exchanging the amount of key tokens that corresponds to the usage fee, and transmits the exchange-completion transaction data to terminal 22 of user 20. In this manner, the exchange, that is, the conversion of key tokens into refrigerator tokens, can be achieved. Note that the intermediary server may belong to decentralized network 50A to which IoT device 10A that is a refrigerator belongs or may belong to decentralized network 50 different from decentralized network 50A.

Next, terminal 22 of user 20 generates usage fee payment transaction data which is transaction data for paying the usage fee for IoT device 10A (S406). The usage fee payment transaction data is one example of the first payment transaction data. The usage fee payment transaction data includes: the address of digital account 21 of user 20 that indicates the source of payment; the address of digital account 11 of IoT device 10A that indicates the destination of payment; and refrigerator tokens indicating the usage fee for IoT device 10A.

Next, terminal 22 of user 20 transmits, to IoT device 10A and the first BC node group, the usage fee payment transaction data generated in Step S406 (S407).

Next, when IoT device 10A and the first BC node group obtain the usage fee payment transaction data from terminal 22 of user 20 (S408), IoT device 10A, terminal 22 of user 20, and the first BC node group execute a consensus algorithm (S409).

In this manner, IoT device 10A, terminal 22 of user 20, and the first BC node group execute the consensus algorithm, thus generate a block including the usage fee payment transaction data, and record the block into the distributed ledger.

Next, IoT device 10A, terminal 22 of user 20, and the first BC node group execute the payment smart contract recorded in the distributed ledger (S410). More specifically, when the payment transaction data generated in Step S406 is recorded into the distributed ledger, in other words, stored into the blockchain, the smart contract that is managed on the blockchain is operated. Subsequently, when the payment smart contract is operated, refrigerator tokens indicating the usage fee are transferred from digital account 21 of user 20 to the digital account of IoT device 10A (S4101). In this manner, using the payment smart contract, system 100 makes it possible to automatically transfer earnings to digital account 11 of IoT device 10A.

Note that in the above description of the example illustrated in FIG. 15, terminal 22 of user 20 generates the usage fee payment transaction data, but this is not limiting. IoT device 10A may generate payment transaction data for the usage fee calculated in Step S406. More specifically, it is sufficient that the processes in Steps S402 to S407 described above be skipped and in Step S402 to Step S407, IoT device 10A generate payment transaction data for the usage fee calculated in Step S401 and transmit the payment transaction data to the first BC node group and terminal 22 of user 20.

In Step S405 described above, the key tokens are exchanged for the refrigerator tokens using the intermediary server, but this is not limiting. The refrigerator tokens and the washing machine tokens may be provided as colored coins. In this case, IoT device 10 that is a washing machine, for example, and IoT device 10A that is a refrigerator, for example, may belong to identical decentralized network 50. Specifically, in Step S405, terminal 22 of user 20 generates exchange transaction data for requesting exchange of the payment amount of tokens included in digital account 21 of user 20, and transmits the exchange transaction data to the first BC node group or IoT device 10A. The exchange transaction data includes: an amount of key tokens that corresponds to the usage fee; and the address of an exchange smart contract capable of exchanging the amount of key tokens for refrigerator tokens. Note that the payment smart contract is programmed so as to be able to exchange the amount of key tokens that corresponds to the usage fee for refrigerator tokens and then make a transfer of the usage fee. When the first BC node group obtains the exchange transaction data, the first BC node group executes the exchange smart contract, generates exchange-completion transaction data including an amount of refrigerator tokens obtained by exchanging the amount of key tokens that corresponds to the usage fee, and transmits the exchange-completion transaction data to terminal 22 of user 20. In this manner, the exchange, that is, the conversion of key tokens into refrigerator tokens, can be achieved.

Figure 16:
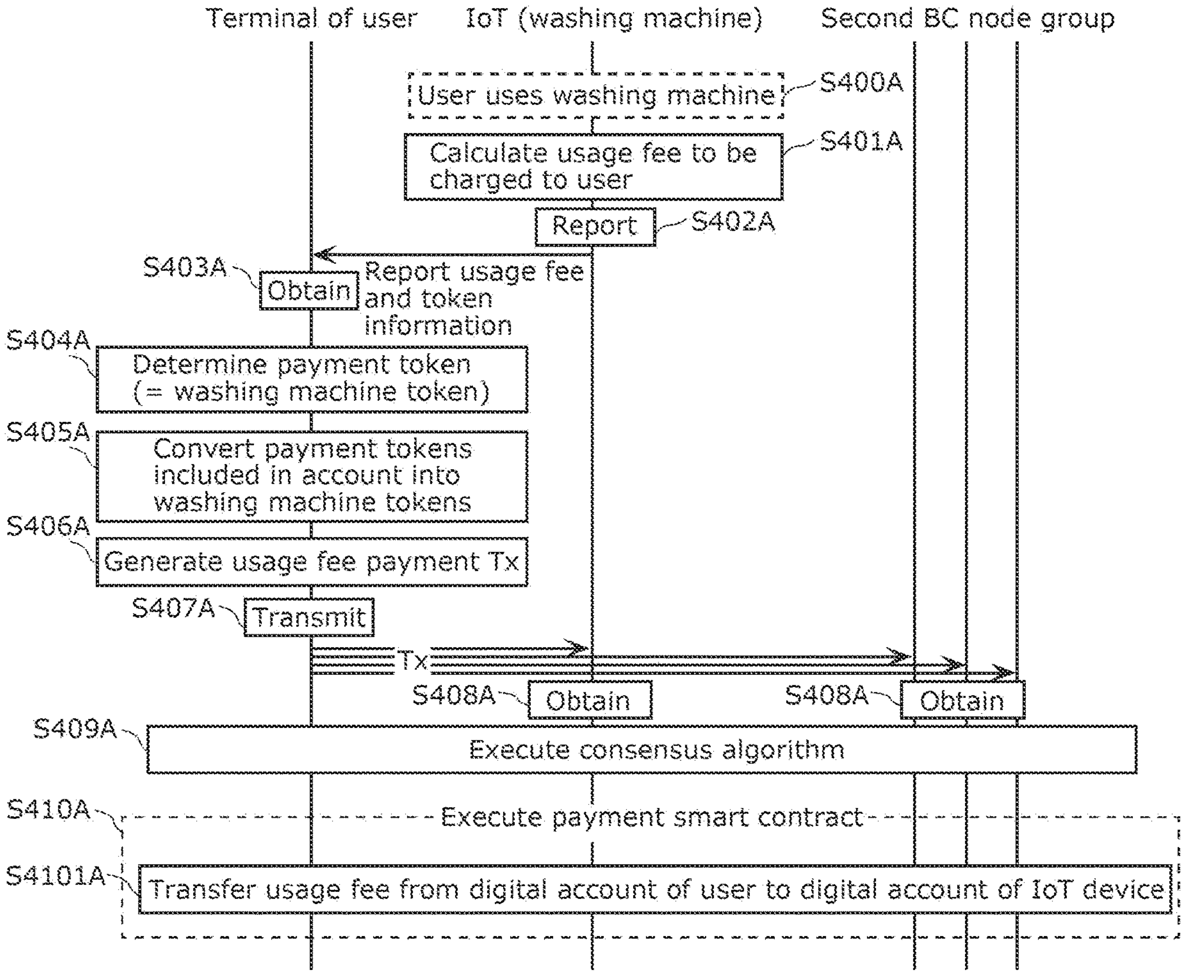
FIG. 16 is a sequence chart illustrating a variation of a usage fee deposit process according to an exemplary embodiment.

FIG. 16 is a sequence chart illustrating a variation of the usage fee deposit process according to the present exemplary embodiment. The example illustrated in FIG. 16 shows the processing to be performed in the case where the usage fee for IoT device 10 that is a washing machine used by user 20 is deposited into digital account 11 of IoT device 10 in washing machine tokens. In FIG. 16, similar to FIG. 15, the plurality of BC nodes 51 are indicated as a second BC node group capable of handling only the washing machine tokens as tokens that can be deposited into the digital accounts; it is assumed in the description that IoT device 10 that is a washing machine and terminal 22 of user 20 also participate as nodes in decentralized network 50 that is a blockchain. Tokens included in digital account 21 of user 20 are key tokens that are different from the washing machine tokens.

Step S400A to Step S410A and Step S4104A are substantially the same as Step S400 to Step S410 and Step S4104 described with reference to FIG. 15 and therefore, description thereof will be omitted.

Note that the above description indicates that as illustrated in FIG. 14, when user 20 uses IoT device 10 that is a washing machine, the usage fee for IoT device 10 needs to be paid in washing machine tokens, and when user 20 uses IoT device 10A that is a refrigerator, the usage fee for IoT device 10A needs to be paid in refrigerator tokens, but this is not limiting. Even when each home appliance such as a refrigerator or a washing machine belongs to a different decentralized network, payment in the same key tokens may be made available. Furthermore, assume that each home appliance such as a refrigerator or a washing machine belongs to a different decentralized network and a different token needs to be used to make payment for each type. Moreover, assume that tokens in the digital account of the source of payment are appropriate for one home appliance. Even in this case, using a table or the like indicating the conversion rate of each type of home appliances to the key tokens, the tokens appropriate for one home appliance may be converted to pay the usage fee.

[2.6 Maintenance Fee Withdrawal Process]

The following will describe an expense process to be performed in the case where a maintenance fee for IoT device 10 is paid from digital account 11 of IoT device 10. Note that examples of the maintenance fee for IoT device 10 include the cost of electricity corresponding to the electric power consumed to operate IoT device 10, the maintenance cost for IoT device 10, the cost of consumable items of IoT device 10, and travel expenses for users who conduct maintenance on IoT device 10.

Figure 17:
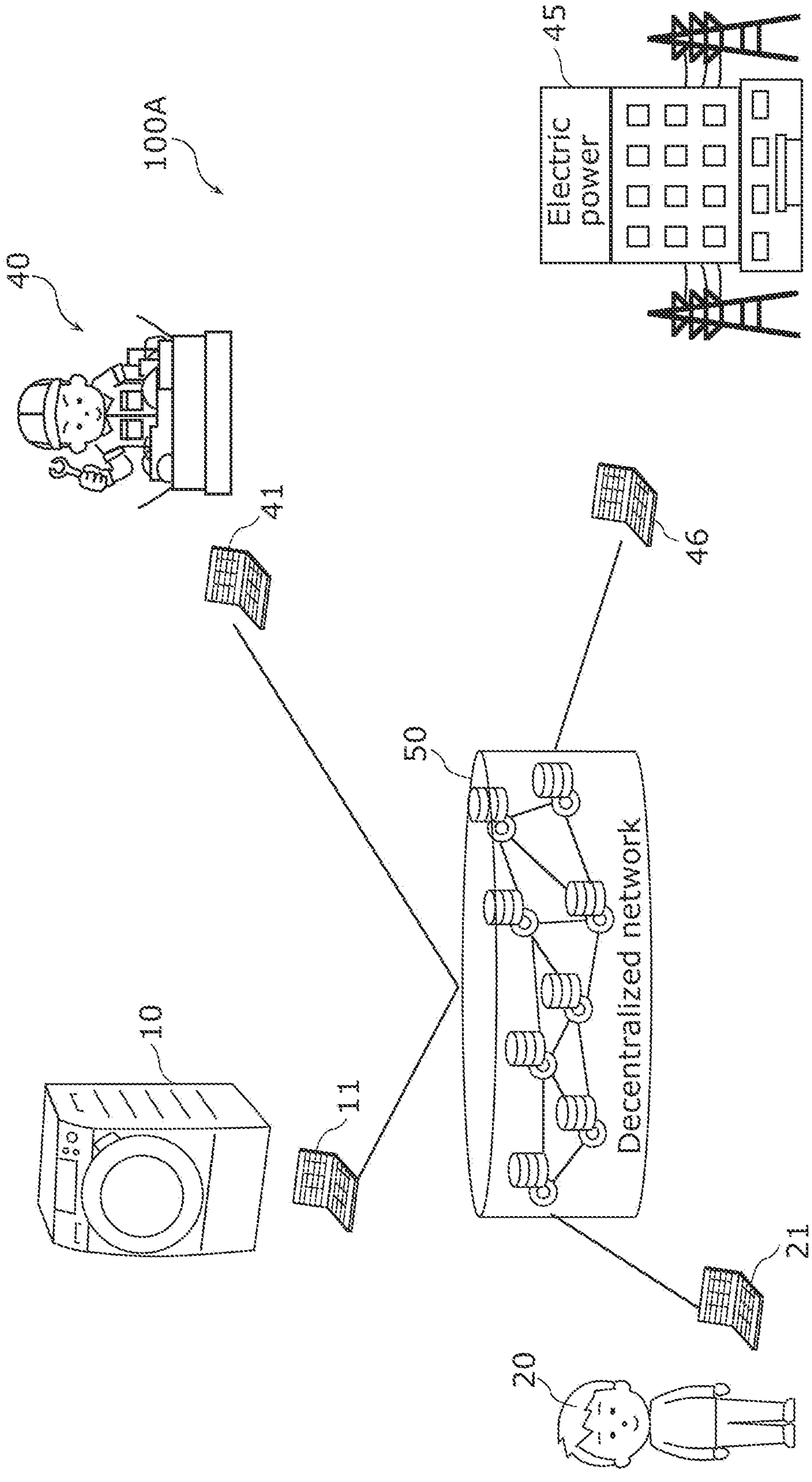
FIG. 17 is a diagram illustrating another example of the overall configuration of a system according to an exemplary embodiment.

FIG. 17 is a diagram illustrating another example of the overall configuration of system 100A according to the present exemplary embodiment. The following description assumes, for example, that IoT device 10, user 20, maintenance company 40 that conducts maintenance, etc., on IoT device 10, and power company 45 that supplies electric power to IoT device 10 are main elements, as illustrated in FIG. 17. Assume that maintenance company 40 has digital account 41 on decentralized network 50, and power company 45 has digital account 46 on decentralized network 50. Elements that are substantially the same as those illustrated in FIG. 1 are assigned the same reference signs and detailed description thereof will be omitted.

Figure 18:
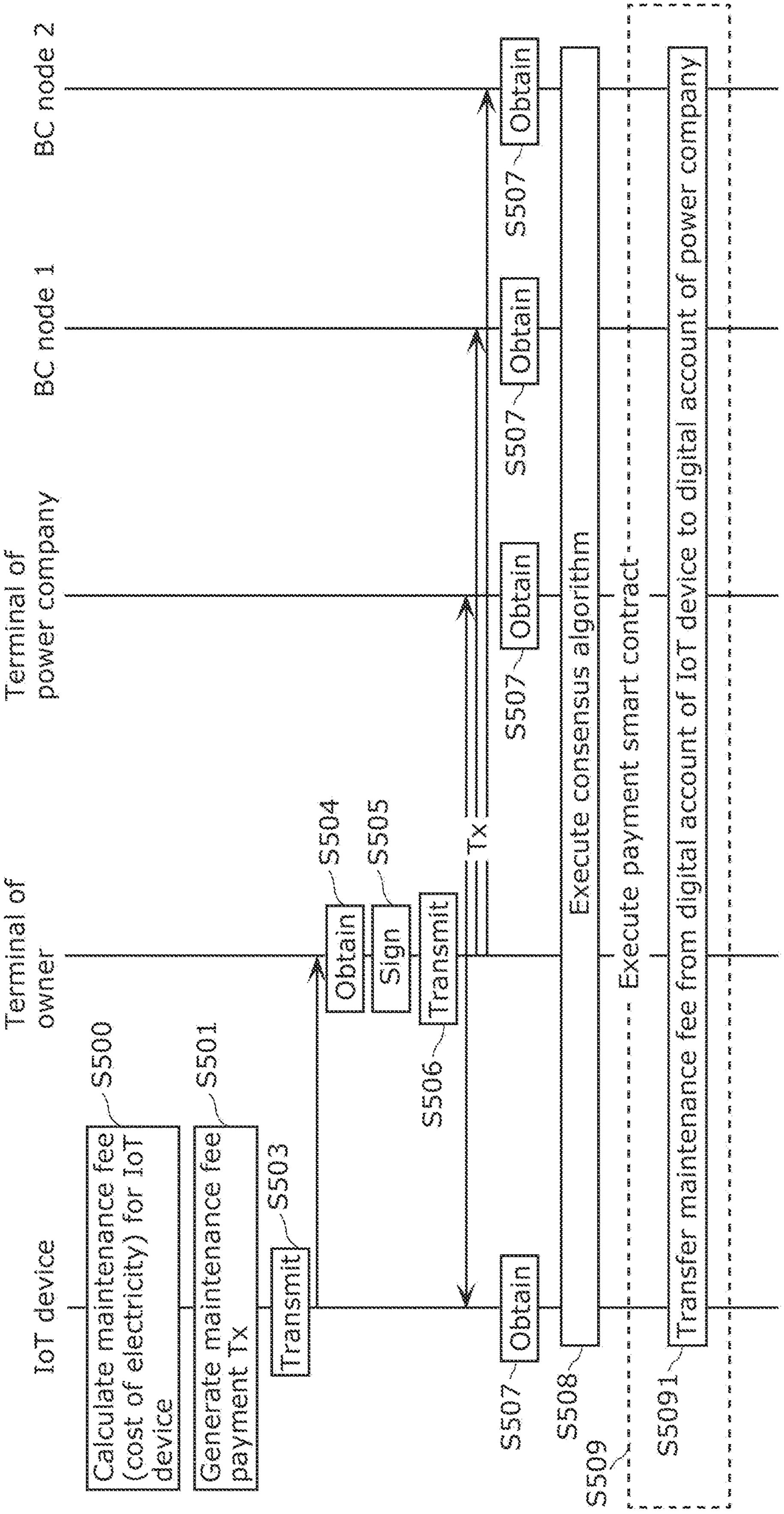
FIG. 18 is a sequence chart illustrating one example of a maintenance fee withdrawal process according to an exemplary embodiment.

FIG. 18 is a sequence chart illustrating one example of a maintenance fee withdrawal process according to the present exemplary embodiment. With reference to the example illustrated in FIG. 18, the processing to be performed in the case where the maintenance fee for IoT device 10 such as the cost of electricity is withdrawn from digital account 11 of IoT device 10A, for example, will be described. In FIG. 18, the plurality of BC nodes 51 are indicated as BC nodes 1, 2; it is assumed in the description that IoT device 10, the terminal of the owner, and the terminal of power company 45 also participate as nodes in decentralized network 50 that is a blockchain. Note that the configurations of the terminal of the owner and the terminal of power company 45 are substantially the same as the configuration of terminal 22.

First, assume that IoT device 10 calculates a maintenance fee such as the cost of electricity (S500). IoT device 10 calculates a maintenance fee by referring to a table of electricity rates obtained from power company 45 via a network. Note that IoT device 10 may obtain the maintenance fee such as the cost of electricity from power company 45 via a network.

Next, IoT device 10 generates payment transaction data for paying the maintenance fee for IoT device 10 such as the cost of electricity (S501). This payment transaction data is one example of the third payment transaction data for paying the maintenance fee for IoT device 10 in tokens. This payment transaction data includes: the address of digital account 11 of IoT device 10 that indicates the source of payment; the address of digital account 46 of power company 45 that indicates the destination of payment; and the amount of tokens indicating the maintenance fee for IoT device 10.

Next, IoT device 10 transmits, to the terminal of the owner, the payment transaction data for the maintenance fee that has been generated in Step S501 (S503).

Next, when the terminal of the owner obtains the payment transaction data for the maintenance fee (S504), the terminal of the owner signs said payment transaction data (S505).

Next, the terminal of the owner transmits, to IoT device 10, the terminal of power company 45, and BC nodes 1, 2, said payment transaction data signed in Step S505 (S506).

Next, when IoT device 10, the terminal of power company 45, and BC nodes 1, 2 obtain said payment transaction data from the terminal of the owner (S507), IoT device 10, the terminal of the owner, the terminal of power company 45, and BC nodes 1, 2 execute a consensus algorithm (S508).

In this manner, IoT device 10, the terminal of the owner, the terminal of power company 45, and BC nodes 1, 2 execute the consensus algorithm, thus generate a block including the payment transaction data for the maintenance fee, and record the block into the distributed ledger.

Next, IoT device 10, the terminal of the owner, the terminal of power company 45, and BC nodes 1, 2 execute the payment smart contract recorded in the distributed ledger (S509). More specifically, in Step S509, when said payment transaction data is recorded into the distributed ledger, in other words, stored into the blockchain, it is possible to operate the payment smart contract that is managed on the blockchain. Subsequently, when the payment smart contract is operated, tokens indicating the maintenance fee can be transferred from digital account 11 of IoT device 10 to digital account 46 of power company 45 (S5091). More specifically, when the payment smart contract is operated, digital account 46 of the destination of payment for the maintenance fee is specified from said payment transaction data, and tokens are deducted from digital account 11 of IoT device 10 and added to digital account 46 of the destination of payment on the basis of said payment transaction data. This makes it possible to automatically transfer the maintenance fee from digital account 11 of IoT device 10 to digital account 46 of power company 45. Thus, IoT device 10 itself can manage expenses and earnings.

Note that in the above description of the example illustrated in FIG. 18, IoT device 10 calculates the cost of electricity as the maintenance fee, but this is not limiting. The terminal of power company 45 may calculate the cost of electricity as the maintenance fee. This will be described below with reference to FIG. 19.

Figure 19:
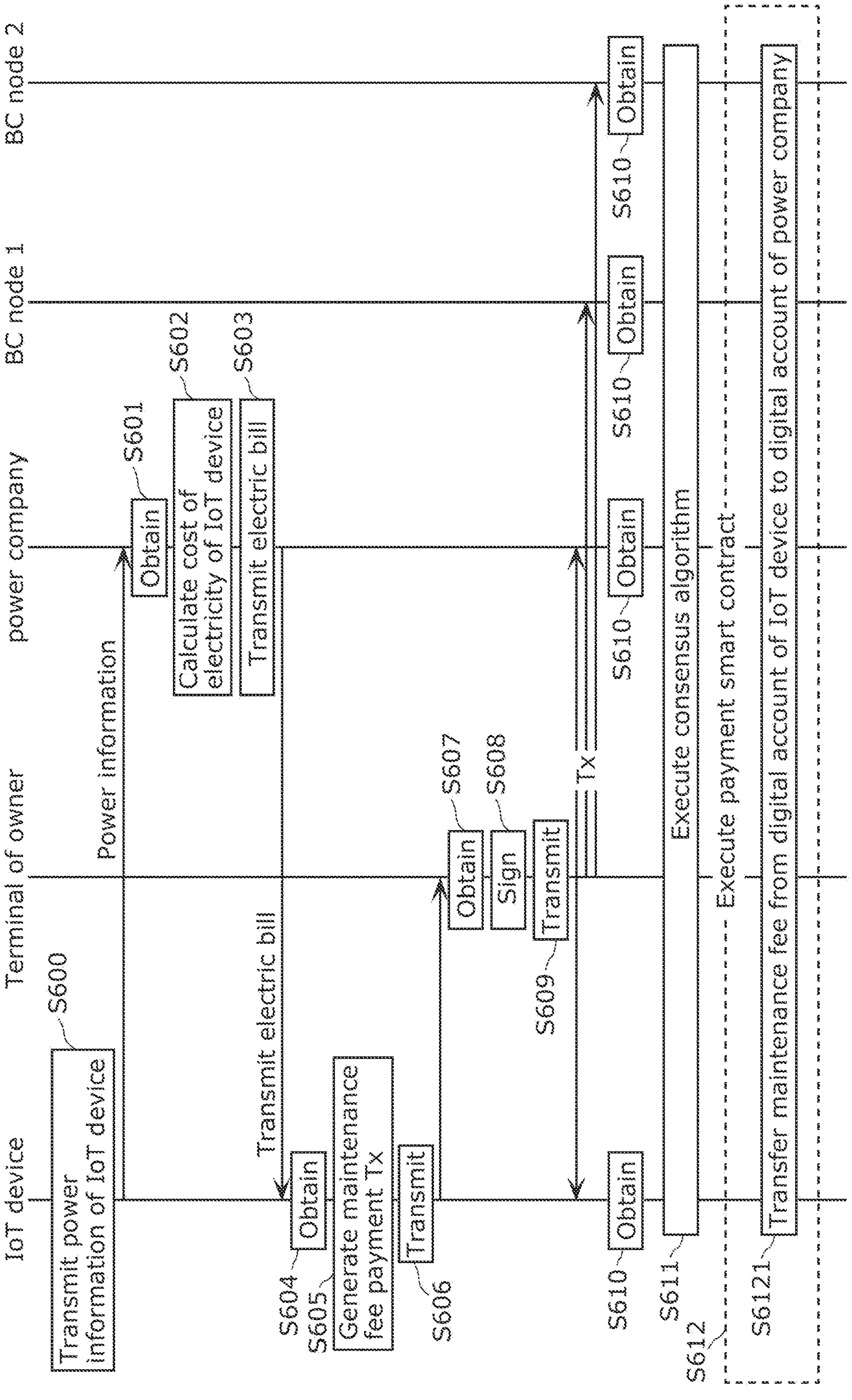
FIG. 19 is a sequence chart illustrating another example of a maintenance fee withdrawal process according to an exemplary embodiment.

FIG. 19 is a sequence chart illustrating another example of the maintenance fee withdrawal process according to the present exemplary embodiment.

First, assume that IoT device 10 calculates power information such as the power consumption of IoT device 10 when used, and transmits the power information to the terminal of power company 45 (S600).

Next, when the terminal of power company 45 obtains the power information of IoT device 10 from IoT device 10 (S601), the terminal of power company 45 calculates the cost of electricity of IoT device 10 as the maintenance fee (S602).

Next, the terminal of power company 45 transmits, to IoT device 10, an electric bill for the cost of electricity calculated in Step S602 (S603).

Next, when IoT device 10 obtains the electric bill from the terminal of power company 45 (S604), IoT device 10 generates payment transaction data for paying the electric bill as the maintenance fee for IoT device 10 (S605). This payment transaction data is one example of the third payment transaction data for paying the maintenance fee for IoT device 10 in tokens.

Subsequent Step S606 to Step S612 and Step S6121 are the same as Step S503 to Step S509 and Step S5091 described above and therefore, description thereof will be omitted.

In this manner, the maintenance fee for IoT device 10 is paid from digital account 11 of IoT device 10, and thus IoT device 10 itself can manage expenses and earnings.

Note that in the above description of the example illustrated in FIG. 19, IoT device 10 generates the payment transaction data of the maintenance fee that is the cost of electricity, but this is not limiting. The terminal of power company 45 may generate the payment transaction data of the maintenance fee that is the cost of electricity and transmit the payment transaction data to the terminal of the owner.

Figure 20:
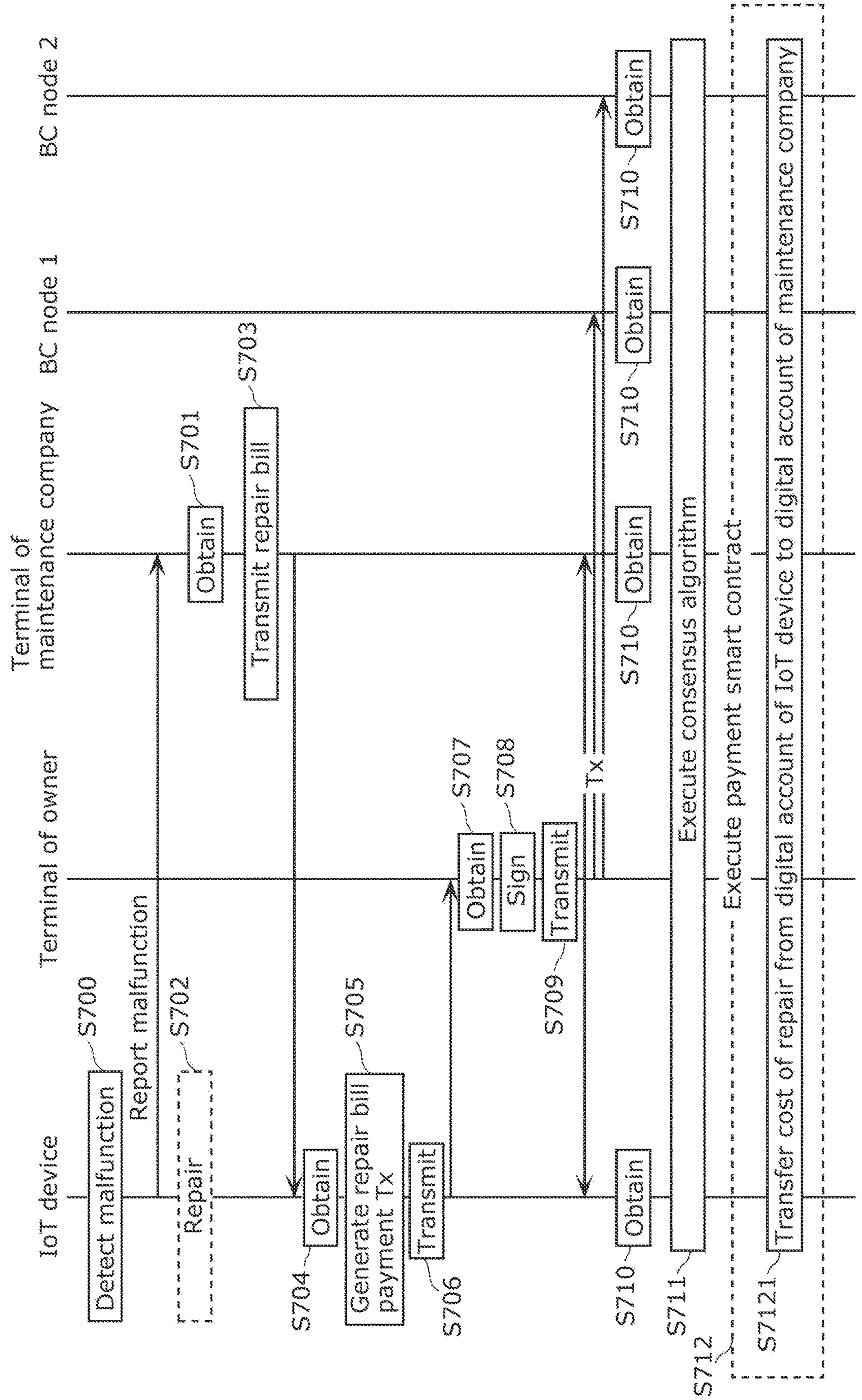
FIG. 20 is a sequence chart illustrating yet another example of a maintenance fee withdrawal process according to an exemplary embodiment.

FIG. 20 is a sequence chart illustrating yet another example of the maintenance fee withdrawal process according to the present exemplary embodiment. With reference to the example illustrated in FIG. 20, the processing to be performed in the case where the maintenance fee for IoT device 10 such as the cost of repair is withdrawn from digital account 11 of IoT device 10, for example, will be described. In FIG. 20, the plurality of BC nodes 51 are indicated as BC nodes 1, 2; it is assumed in the description that IoT device 10, the terminal of the owner, and the terminal of maintenance company 40 also participate as nodes in decentralized network 50 that is a blockchain. Note that the configurations of the terminal of the owner and the terminal of maintenance company 40 are substantially the same as the configuration of terminal 22.

First, when IoT device 10 detects a malfunction (S700), IoT device 10 reports the occurrence of the malfunction to the terminal of maintenance company 40.

Next, when the terminal of maintenance company 40 obtains, from IoT device 10, the report indicating the occurrence of the malfunction of IoT device 10 (S701), the terminal of maintenance company 40 sends a person who performs repairs, for example, to repair IoT device 10 (S702).

When IoT device 10 is repaired in Step S702, the terminal of maintenance company 40 calculates the cost of repair of IoT device 10 as the maintenance fee and transmits, to IoT device 10, a repair bill for the cost of repair calculated (S703).

Next, when IoT device 10 obtains the repair bill from the terminal of maintenance company 40 (S704), IoT device 10 generates payment transaction data for paying the repair bill as the maintenance fee for IoT device 10 (S705). This payment transaction data is one example of the third payment transaction data for paying the maintenance fee for IoT device 10 in tokens. This payment transaction data includes: the address of digital account 11 of IoT device 10 that indicates the source of payment; the address of digital account 41 of maintenance company 40 that indicates the destination of payment; and tokens indicating the maintenance fee for IoT device 10.

Next, IoT device 10 transmits, to the terminal of the owner, the payment transaction data for the maintenance fee that has been generated in Step S705 (S706).

Subsequent Step S707 to Step S712 are the same as Step S504 to Step S509 described above and therefore, description thereof will be omitted.

In Step S712, when said payment transaction data is recorded into the distributed ledger, in other words, stored into the blockchain, the payment smart contract that is managed on the blockchain is operated. Subsequently, when the payment smart contract is operated, tokens indicating the cost of repair that is the maintenance fee are transferred from digital account 11 of IoT device 10 to digital account 41 of maintenance company 40 (S7121).

In this manner, the maintenance fee for IoT device 10 is paid from digital account 11 of IoT device 10, and thus IoT device 10 itself can manage expenses and earnings.

Note that in the above description of the example illustrated in FIG. 20, IoT device 10 generates the payment transaction data of the maintenance fee that is the cost of repair, but this is not limiting. The terminal of maintenance company 40 may generate the payment transaction data of the maintenance fee that is the cost of repair and transmit the payment transaction data to the terminal of the owner.

In this manner, when the smart contract that is managed on the blockchain is operated, the smart contract can automatically transfer the maintenance fee from digital account 11 of IoT device 10 to the digital account of the destination of payment.

[2.7 Variation of Maintenance Fee Withdrawal Process]

The foregoing has thus far described the processing to be performed in the case where IoT device 10 pays the maintenance fee, but this is not limiting. It is also conceivable that manufacturer 30 of IoT device 10 sells IoT device 10 at a price including the cost of electricity and pays the maintenance fee as a platform provider.

Figure 21:
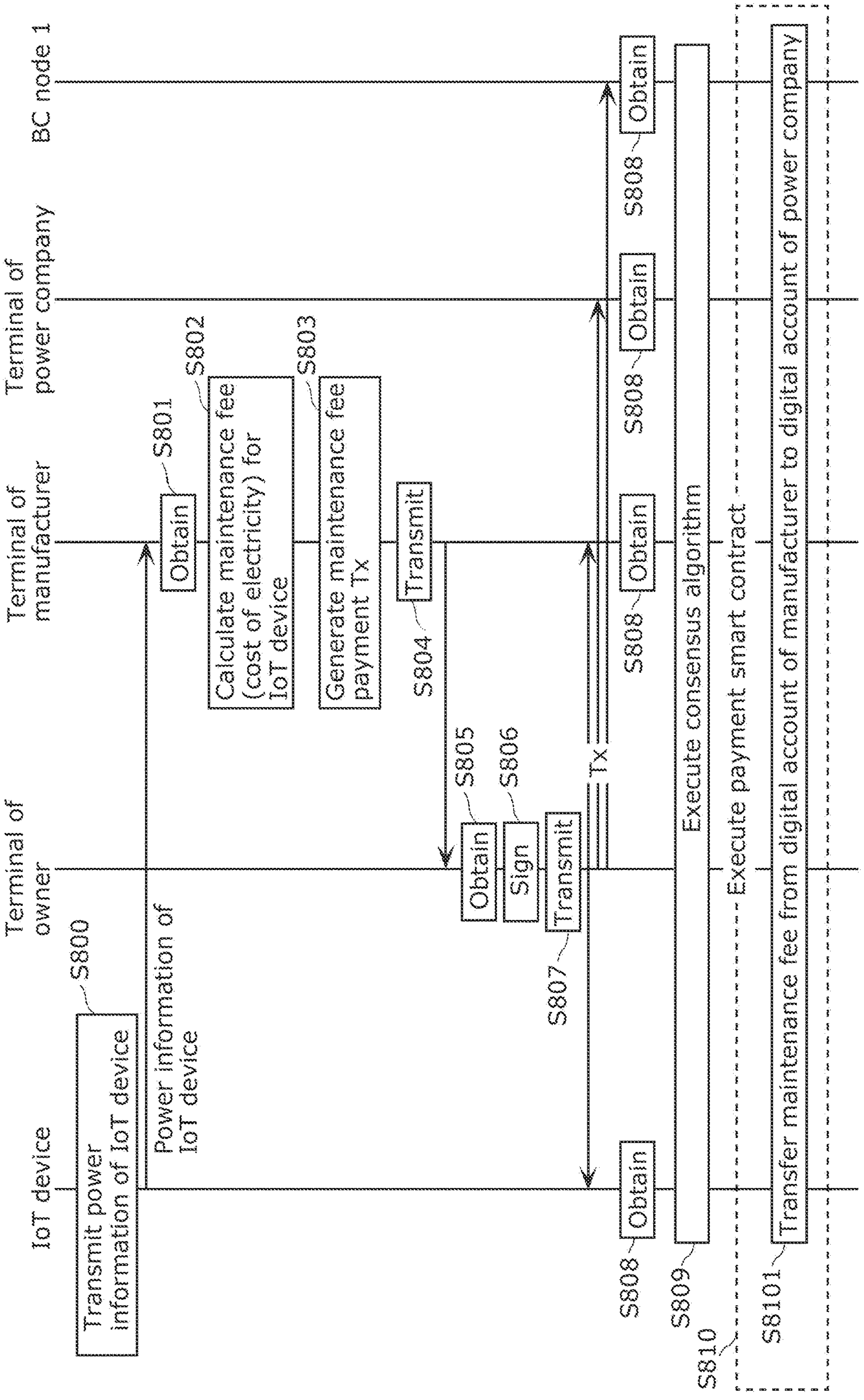
FIG. 21 is a sequence chart illustrating a variation of a maintenance fee withdrawal process according to an exemplary embodiment.

FIG. 21 is a sequence chart illustrating a variation of the maintenance fee withdrawal process according to the present exemplary embodiment.

With reference to the example illustrated in FIG. 21, the processing to be performed in the case where the maintenance fee for IoT device 10 such as the cost of electricity is withdrawn from digital account 31 of manufacturer 30, for example, will be described. In FIG. 21, the plurality of BC nodes 51 are indicated as BC node 1; it is assumed in the description that IoT device 10, the terminal of the owner, the terminal of manufacturer 30, and the terminal of the power company also participate as nodes in decentralized network 50 that is a blockchain.

First, assume that IoT device 10 calculates power information such as the power consumption of IoT device 10 when used, and transmits the power information to the terminal of manufacturer 30 (S800).

Next, when the terminal of manufacturer 30 obtains the power information of IoT device 10 from IoT device 10 (S801), the terminal of manufacturer 30 calculates the cost of electricity of IoT device 10 as the maintenance fee (S802).

Next, the terminal of manufacturer 30 generates payment transaction data for paying the electric bill as the maintenance fee for IoT device 10 (S803). This payment transaction data is one example of the third payment transaction data for paying the maintenance fee for IoT device 10 in tokens. This payment transaction data includes: the address of digital account 31 of manufacturer 30 that indicates the source of payment; the address of digital account 46 of power company 45 that indicates the destination of payment; and tokens indicating the maintenance fee for IoT device 10.

Next, the terminal of manufacturer 30 transmits, to the terminal of the owner, the payment transaction data for the maintenance fee that has been generated in Step S803 (S804).

Subsequent Step S805 to Step S810 are the same as Step S504 to Step S509 described above and therefore, description thereof will be omitted.

In Step S810, when said payment transaction data is recorded into the distributed ledger, in other words, stored into the blockchain, the payment smart contract that is managed on the blockchain is operated. Subsequently, when the payment smart contract is operated, tokens indicating the cost of electricity that is the maintenance fee for IoT device 10 are transferred from digital account 31 of manufacturer 30 to digital account 46 of power company 45 (S8101).

Figure 22:
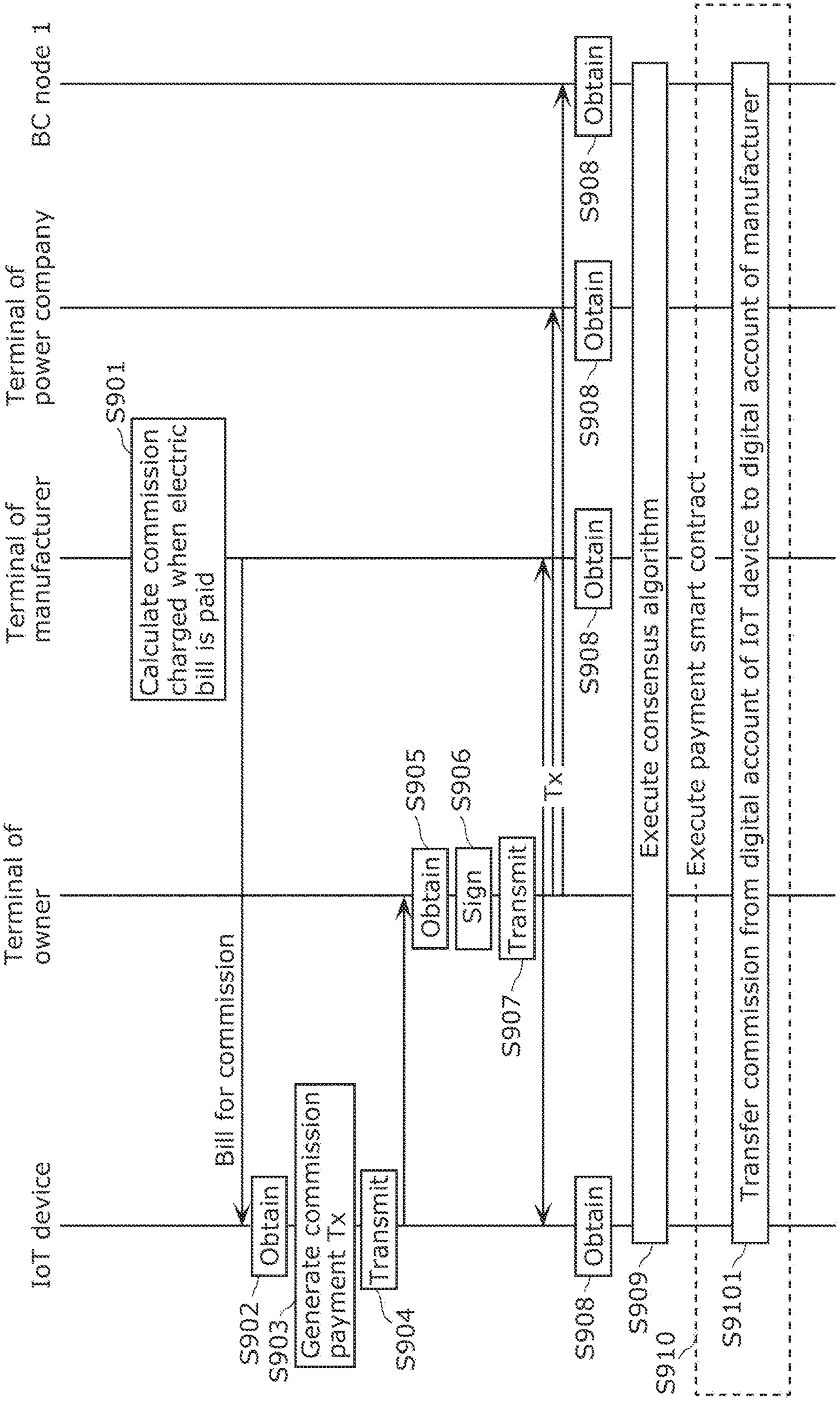
FIG. 22 is a sequence chart illustrating a variation of a maintenance fee withdrawal process according to an exemplary embodiment.

FIG. 22 is a sequence chart illustrating a variation of the maintenance fee withdrawal process according to the present exemplary embodiment.

With reference to the example illustrated in FIG. 22, the following will describe processes in which only a commission charged upon payment of the maintenance fee for IoT device 10 by manufacturer 30 is withdrawn from digital account 11 of IoT device 10 will be described. In FIG. 22, similar to FIG. 21, the plurality of BC nodes 51 are indicated as BC node 1; it is assumed in the description that IoT device 10, the terminal of the owner, the terminal of manufacturer 30, and the terminal of the power company also participate as nodes in decentralized network 50 that is a blockchain.

First, assume that when the terminal of manufacturer 30 pays the electric bill as the maintenance fee in the processes illustrated in FIG. 21, the terminal of manufacturer 30 calculates a commission charged upon payment of the electric bill (S901) and transmits the calculation result to IoT device 10. The terminal of manufacturer 30 can calculate the commission with reference to a table showing a commission in association with a corresponding electricity rate.

Next, when IoT device 10 obtains a bill for the commission from the terminal of manufacturer 30 (S902), IoT device 10 generates payment transaction data for paying the commission as the maintenance fee for IoT device 10 (S903). This payment transaction data is one example of the third payment transaction data for paying the maintenance fee for IoT device 10 in tokens. This payment transaction data includes: the address of digital account 11 of IoT device 10 that indicates the source of payment; the address of digital account 31 of manufacturer 30 that indicates the destination of payment; and tokens indicating the commission.

Next, IoT device 10 transmits, to the terminal of the owner, the payment transaction data for the commission as the maintenance fee that has been generated in Step S903 (S904).

Subsequent Step S905 to Step S910 are the same as Step S504 to Step S509 described above and therefore, description thereof will be omitted.

In Step S910, when said payment transaction data is recorded into the distributed ledger, in other words, stored into the blockchain, the payment smart contract that is managed on the blockchain is operated. Subsequently, when the payment smart contract is operated, tokens indicating the commissions as the maintenance fee for IoT device 10 are transferred from digital account 11 of IoT device 10 to digital account 31 of manufacturer 30 (S9101).

[2.8 Advantageous Effects of Exemplary Embodiment]

According to the present exemplary embodiment, IoT device 10 can have digital account 11 using an address accessible on a network. With this, it is possible to provide a method for controlling IoT device 10 that itself can manage earnings such as the usage fee.

Furthermore, when IoT device 10 has digital account 11, the usage fee that is charged for use of IoT device 10 can be transferred to digital account 11 of IoT device 10, and the maintenance fee for IoT device 10 can be paid from the digital account of IoT device 10, for example. Moreover, the purchase amount charged for purchase of the log data of IoT device 10 can also be transferred to digital account 11 of IoT device 10. This allows IoT device 10 itself to manage earnings such as the usage fee. This allows the transition from a form in which IoT device 10 is purchased and used as in the conventional technique to a new form in which IoT device 10 is shared and used by two or more users on a pay-per-use basis.

Furthermore, IoT device 10 may distribute, to owners who are one or more proprietors, earnings transferred to digital account 11 of IoT device 10. This allows the transition from a form in which the IoT device is purchased and used as in the conventional technique to a new form in which the IoT device is owned by two or more users who can be replaced and profit obtained by the IoT device is distributed to the two or more users who own the IoT device.

Furthermore, digital account 11 of IoT device 10 may be managed on a blockchain. This allows IoT device 10 itself to manage earnings such as the usage fee using digital account 11 having traceability and tamper-proof features.

Moreover, the use of the smart contract makes it possible to automatically transfer earnings such as the usage fee and the purchase amount of the log data to digital account 11 of IoT device 10 and automatically distribute the profit obtained by the IoT device to the one or more proprietors of the IoT device, for example.

[3 Other Variations]

Although the present disclosure has been thus far described based on the above exemplary embodiment, it goes without saying that the present disclosure is not limited to the above exemplary embodiment. The following cases are also included in the present disclosure.

(1) In the above exemplary embodiment, IoT device 10 debits the maintenance fee from digital account 11 of IoT device 10 itself to pay the maintenance fee, but there may be cases where digital account 11 of IoT device 10 does not have enough money to pay the maintenance fee. In these cases, IoT device 10 may have another IoT device 10 pay the maintenance fee on behalf of said IoT device 10 and then repay the amount later. In this manner, if expenses such as the maintenance fee cannot be paid because the balance of the digital account of the IoT device is insufficient, the expenses can be covered and paid by another IoT device. This allows the IoT device itself to manage expenses and earnings without user intervention. This will be described below with reference to FIG. 23.

Figure 23:
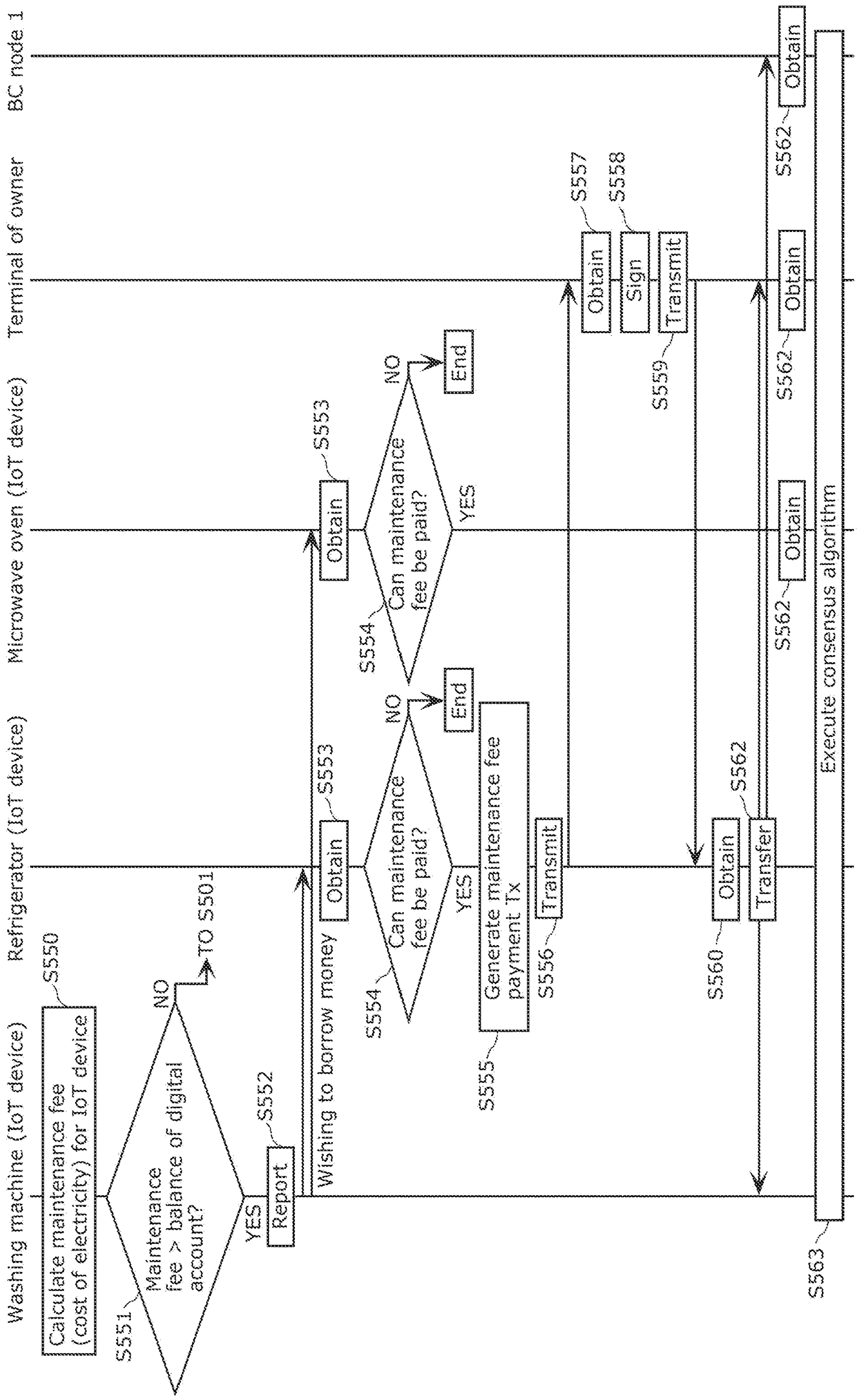
FIG. 23 is a sequence chart of a maintenance fee withdrawal process according to another variation.

FIG. 23 is a sequence chart of a maintenance fee withdrawal process according to another variation. With reference to the example illustrated in FIG. 23, the processing to be performed in the case where the maintenance fee for IoT device 10 such as the cost of electricity is covered by another IoT device 10, for example, will be described. In FIG. 23, the plurality of BC nodes 51 are indicated as BC node 1; it is assumed in the description that IoT devices 10 that are a washing machine, a refrigerator, and a microwave oven, for example, and the terminal of the owner also participate as nodes in decentralized network 50 that is a blockchain.

First, assume that a washing machine that is IoT device 10 calculates a maintenance fee such as the cost of electricity (S550). This means that IoT device 10 calculates the maintenance fee for IoT device 10 itself.

Next, the washing machine checks whether the maintenance fee calculated in Step S550 is greater than the balance of digital account 11 of the washing machine itself (S551).

When the maintenance fee calculated in Step S550 is greater than the balance of digital account 11 of the washing machine in Step S551 (YES in S551), a report that requests other IoT devices 10 that are the refrigerator and the microwave oven to cover the maintenance fee, in other words, a report indicating that a loan is requested, is transmitted (S552). Here, when the balance of digital account 11 of IoT device 10 that is a washing machine is less than the maintenance fee calculated, the washing machine may generate fourth transaction data for requesting payment of the maintenance fee on behalf of the washing machine. In this case, it is sufficient that the washing machine that is IoT device 10 transmit the generated transaction data to one or more other IoT devices 10 that are different from said IoT device 10.

Next, when the refrigerator and the microwave oven that are other IoT devices 10 obtain the report (S553), the refrigerator and the microwave oven refer to digital account 11 thereof and checks whether the maintenance fee for the washing machine can be paid (S554). The following will describe the case where the refrigerator that is another IoT device 10 covers the maintenance fee.

When it is determined in Step S554 that the maintenance fee reported in Step S552 can be paid (YES in S554), payment transaction data for paying the maintenance fee on behalf of the washing machine is generated (S555). Note that when the maintenance fee cannot be paid (NO in S554), the processing ends. This payment transaction data is one example of the fourth payment transaction data for paying the maintenance fee on behalf of said IoT device. This payment transaction data includes: the address of digital account 11 of another IoT device 10 that indicates the substitute source of payment; the address of digital account 46 of power company 45 that indicates the destination of payment; and tokens indicating the maintenance fee for IoT device 10.

Next, the refrigerator that is another IoT device 10 transmits, to the terminal of the owner, the payment transaction data for the maintenance fee that has been generated in Step S555 (S556).

Subsequent Step S557 to Step S563 are the same as Step S504 to Step S508 described above and therefore, description thereof will be omitted.

Note that when the maintenance fee calculated in Step S550 is less than or equal to the balance of digital account 11 of the washing machine in Step S551 (NO in S551), it is sufficient that the process in Step S501 described with reference to FIG. 18 be performed. In other words, when the balance of digital account 11 of IoT device 10 is greater than the maintenance fee calculated, it is sufficient that the payment transaction data be generated so that the maintenance fee is transferred from the digital account of IoT device 10 to the digital account of the destination of payment of the maintenance fee.

(2) The foregoing (1) indicates that when digital account 11 of IoT device 10 does not have enough money to pay the maintenance fee, IoT device 10 has another IoT device 10 pay the maintenance fee on behalf of said IoT device 10, but this is not limiting. IoT device 10 may obtain a loan from another IoT device 10 in tokens for the maintenance fee, pay the maintenance fee, and repay the loan later.

More specifically, assume that IoT device 10 specifies the maintenance fee for IoT device 10 itself and the balance of digital account 11 of IoT device 10 is less than the maintenance fee calculated. In this case, IoT device 10 may transmit log information of IoT device 10 or credit information including balance information of digital account 11 of IoT device 10 to one or more IoT devices different from IoT device 10. Subsequently, IoT device 10 may obtain loan tokens corresponding to the maintenance fee from first IoT device 10 determined to cover the maintenance fee among one or more other IoT devices 10. The loan tokens include information regarding at least one of a loan amount, an interest rate, and a loan period. The loan tokens are one example of the fourth amount. When BC node 51, etc., obtains the payment transaction data generated by IoT device 10, BC node 51, etc., causes the payment smart contract to specify the digital account of the destination of payment of the maintenance fee from the payment transaction data obtained. Thus, BC node 51, etc., can cause the payment smart contract to transfer the loan tokens from the digital account of IoT device 10 to the digital account of the destination of payment on the basis of the payment transaction data and the loan tokens.

Thereafter, when the balance of digital account 11 of IoT device 10 exceeds said maintenance fee, IoT device 10 specifies the digital account of first IoT device 10 from the load tokens. Subsequently, it is sufficient that IoT device 10 transfer tokens corresponding to the loan tokens from digital account 11 of IoT device 10 to the digital account of the first IoT device.

In this manner, when expenses such as the maintenance fee cannot be paid because the balance of digital account 11 of IoT device 10 is insufficient, the expenses can be paid with a loan from another IoT device 10 and then, when the balance increases, the loan can be repaid. This allows IoT device 10 itself to manage expenses and earnings without user intervention.

(3) Note that the above description assumes that IoT device 10 is a home appliance such as a washing machine or a device such as a personal computer installed in a space such as a shared room, but this is not limiting. IoT device 10 may be photovoltaic equipment that transmits electric power generated using solar panels or solar cells.

In this case, IoT device 10 can earn revenue by selling the electric power generated using the solar cells. This means that user 20 can use electric power through the use of the photovoltaic equipment that is IoT device 10, and the usage fee for IoT device 10 may be an amount on an electric bill. Thus, the deposit process, etc., described above can be applied.

The revenue from the photovoltaic equipment that is IoT device 10 may be money invested in installing the solar panels.

(4) Note that in the above description, the usage fee, etc., is paid in tokens; the tokens may be non-fungible tokens (NFTs).

(5) The digital account of IoT device 10 has been described thus far as a digital account associated with real IoT device 10, but this is not limiting. The digital account of IoT device 10 may be a digital account associated in a metaverse (virtual space), and real IoT device 10, a virtual IoT device associated therewith, and a digital account may be combined as one set. Thus, for example, when a virtual washing machine associated with a real, shared washing machine in a shared house is present in a shared house metaverse (virtual space) that mimics the shared house, earnings and expenses related to the virtual washing machine can be managed in a digital account shared with the real, shared washing machine.

Note that examples of the expenses related to the virtual washing machine include a metaverse server usage fee and a cost for changing the appearance of the virtual washing machine. Examples of the earnings related to the virtual washing machine include a prepayment paid to reserve the future use of the real washing machine via the virtual washing machine and revenue from advertisements displayed on the virtual washing machine.

(6) The foregoing describes the case where tokens that are the usage fee transferred to digital account 11 of IoT device 10 are allocated to the digital accounts of one or more owners using the allocation smart contract, but this is not limiting. Tokens that are the usage fee transferred to digital account 11 of IoT device 10 may be allocated using the allocation smart contract to (one or more) allocation persons (owner substitutes) acknowledged by the owners. Furthermore, for example, allocation right NFTs issued by the owners or the owner substitutes may be circuited in the market, and tokens may be allocated to persons who have the NFTs at the time.

(7) Each of the devices according to the above exemplary embodiments is specifically a computer system configured of a microprocessor, read only memory (ROM), random access memory (RAM), a hard disk unit, a display unit, a keyboard, and a mouse, for example. A computer program is recorded on the RAM or the hard disk unit. Each of the devices achieves its function as a result of the microprocessor operating according to the computer program. Here, the computer program is configured of a combination of command codes indicating instructions to the computer in order to achieve a predetermined function.

(8) Some or all of the structural elements included in each of the devices according to the above exemplary embodiment may be configured from a single system Large Scale Integration (LSI). A system LSI is a super-multifunction LSI manufactured with a plurality of components integrated on a single chip, and is specifically a computer system configured of a microprocessor, ROM, and RAM, for example. A computer program is recorded on the RAM. The system LSI achieves its function as a result of the microprocessor operating according to the computer program.

Furthermore, each unit of the structural elements included in each of the devices described above may be individually configured into a single chip, or some or all of the units may be configured into a single chip.

Moreover, although a system LSI is mentioned here, the integrated circuit can also be called an IC, a LSI, a super LSI, and an ultra LSI, depending on the level of integration. Furthermore, the method of circuit integration is not limited to LSIs, and implementation through a dedicated circuit or a general-purpose processor is also possible. A field programmable gate array (FPGA) which allows programming after LSI manufacturing or a reconfigurable processor which allows reconfiguration of the connections and settings of the circuit cells inside the LSI may also be used.

In addition, depending on the emergence of circuit integration technology that replaces LSI due to progress in semiconductor technology or other derivative technology, it is obvious that such technology may be used to integrate the function blocks. Possibilities in this regard include the application of biotechnology and the like.

(9) Some or all of the structural elements included in each of the devices described above may be implemented as a standalone module or an IC card that can be inserted into and removed from the device. The IC card or the module is a computer system made up of a microprocessor, ROM, RAM, and so on. The IC card or the module may include the aforementioned super multifunctional LSI. The IC card or the module achieves its functions as a result of the microprocessor operating according to the computer program. The IC card and the module may be tamper-proof.

(10) The present disclosure may be the above-described methods. Furthermore, the present disclosure may be a computer program for implementing these methods using a computer or may be a digital signal of the computer program.

Furthermore, the present disclosure may be the computer program or digital signal recorded on recording media readable by a computer, such as a flexible disk, a hard disk, a compact disc read-only memory (CD-ROM), a magneto-optical disc (MO), a digital versatile disc (DVD), a DVD-ROM, a DVD-RAM, a Blu-ray (registered trademark) disc (BD), or a semiconductor memory, for example. The present disclosure may also be the digital signal recorded on these recoding media.

Furthermore, in the present disclosure, the computer program or the digital signal may be transmitted via an electrical communication line, a wireless or wired communication line, a network represented by the Internet, data broadcasting, or the like.

Furthermore, the present disclosure may be a computer system including a microprocessor and memory. The memory may have the computer program recorded thereon, and the microprocessor may operate according to the computer program.

Moreover, by transferring the recording medium having the program or the digital signal recorded thereon or by transferring the program or the digital signal via the network or the like, the present disclosure may be implemented by a different independent computer system.

(11) The above exemplary embodiment and the above variations may be combined with each other.

INDUSTRIAL APPLICABILITY

The present disclosure can be used for a control method, an IoT device, and a program that are applied to provide a shared home appliances etc., that earn revenue by causing the home appliance or the IoT device installed in a space to have a digital account and allowing the home appliance or the IoT device to transmit and receive digital currencies.

The invention claimed is:

1. A control method, wherein each of an Internet of things (IoT) device and a user who uses the IoT device has a digital account, the control method comprises:

obtaining first transaction data for allowing the user who used the IoT device to transfer a first amount corresponding to a usage amount of the IoT device, the first transaction data including (i) an address of the digital account of the user, the address indicating a source of payment, (ii) an address of the digital account of the IoT device, the address indicating a destination of the payment, and (iii) the first amount indicating the usage amount of the IoT device;

specifying the digital account of the IoT device by referring to first association information associating the address of the digital account of the IoT device included in the first transaction data obtained and an identifier uniquely assigned to hardware of the IoT device; and transferring the usage amount of the IoT device to the digital account of the IoT device by deducting the first amount from the digital account of the user and adding the first amount to the digital account of the IoT device based on the first transaction data obtained, the IoT device is owned by two or more owners, the control method further comprises the following, performed when the first amount is transferred to the digital account of the IoT device:

specifying the two or more owners of the IoT device and allocation information indicating allocation for each of the two or more owners by referring to second association information associating addresses of digital accounts of the two or more owners of the IoT device with the allocation information;

determining an amount of allocation for each of the two or more owners based on the allocation information; and allocating, to a digital account of each of the two or more owners specified, the first amount transferred to the digital account of the IoT device, according to the amount of allocation determined, each of the address of the digital account of the user, the address of the digital account of the IoT device, and the addresses of digital accounts of the two or more owners is a blockchain address, each of the digital account of the user, the digital account of the IoT device, and the digital accounts of the two or more owners specified is managed on a blockchain, the control method further comprises:

storing, into the blockchain, the first transaction data obtained to operate a smart contract managed on the blockchain;

causing the smart contract to transfer the first amount from the digital account of the user to the digital account of the IoT device; and allocating, by the smart contract, the first amount transferred to the digital account of the IoT device to the digital accounts of the two or more owners specified, the IoT device is photovoltaic equipment that transmits electric power generated using a solar cell, the user uses the electric power through use of the photovoltaic equipment, and the usage amount of the IoT device is an amount on an electric bill.

2. The control method according to claim 1, wherein the identifier includes at least one of:

a model number of the IoT device;

a product number of the IoT device;

a serial number of the IoT device; or a license plate of the IoT device.

3. The control method according to claim 1, further comprising:

obtaining second transaction data for allowing a user who purchased log data of the IoT device to transfer a second amount corresponding to a purchase amount of the log data to the digital account of the IoT device;

specifying, from the second transaction data obtained, the digital account of the IoT device that is associated with the identifier uniquely assigned to the hardware of the IoT device; and transferring the purchase amount of the log data to the digital account of the IoT device by deducting the second amount from the digital account of the user and adding the second amount to the digital account of the IoT device based on the second transaction data obtained.

4. The control method according to claim 1, further comprising:

obtaining third transaction data for transferring a third amount corresponding to a maintenance fee for the IoT device;

specifying a digital account of a destination of payment of the maintenance fee from the third transaction data obtained; and transferring the maintenance fee to the digital account of the destination of the payment by deducting the third amount from the digital account of the IoT device and adding the third amount to the digital account of the destination of the payment based on the third transaction data obtained.

5. The control method according to claim 4, further comprising:

storing, into a blockchain, the third transaction data obtained, to operate a smart contract managed on the blockchain; and transferring, by the smart contract, the maintenance fee from the digital account of the IoT device to the digital account of the destination of the payment.

6. The control method according to claim 1, further comprising, by a first terminal different from the IoT device:

obtaining the identifier uniquely assigned to the hardware of the IoT device;

determining an address of the digital account of the IoT device; and outputting, to a database, information indicating association between the identifier and the address, and causing the database to store the information.

7. The control method according to claim 6, wherein the first terminal is a terminal held by a manufacturer that has produced the IoT device.

8. The control method according to claim 4, further comprising:

calculating the maintenance fee for the IoT device;

when a balance of the digital account of the IoT device is less than the maintenance fee calculated, generating fourth transaction data for requesting payment of the maintenance fee on behalf of the IoT device, and transmitting, to one or more other IoT devices different from the IoT device, the fourth transaction data generated; and when a balance of a digital account of a first IoT device included in the one or more other IoT devices is greater than the maintenance fee calculated, obtaining the third transaction data, and transferring the maintenance fee from the digital account of the first IoT device to the digital account of the destination of the payment of the maintenance fee.

9. The control method according to claim 8, wherein the maintenance fee includes at least one of:

a cost of electricity corresponding to electric power consumed to operate the IoT device;

a maintenance cost for the IoT device;

a cost of a consumable item of the IoT device; or a travel expense for a user who conducts maintenance on the IoT device.

10. The control method according to claim 4, further comprising:

calculating the maintenance fee for the IoT device;

when a balance of the digital account of the IoT device is less than the maintenance fee calculated, transmitting, to one or more other IoT devices different from the IoT device, credit information including log information of the IoT device or balance information of the digital account of the IoT device;

obtaining a fourth amount corresponding to a loan amount for the maintenance fee from a first IoT device determined to pay the maintenance fee on behalf of the IoT device, the first IoT device being included in the one or more other IoT devices;

obtaining the third transaction data;

specifying the digital account of the destination of the payment of the maintenance fee from the third transaction data obtained; and transferring the fourth amount from the digital account of the IoT device to the digital account of the destination of the payment based on the third transaction data obtained and the fourth amount.

11. The control method according to claim 10, wherein the fourth amount includes information regarding at least one of:

the loan amount;

an interest rate; or a loan period.

12. The control method according to claim 10, further comprising:

when the balance of the digital account of the IoT device exceeds the maintenance fee, specifying a digital account of the first IoT device from the fourth amount; and transferring tokens corresponding to the fourth amount from the digital account of the IoT device to the digital account of the first IoT device.

13. An Internet of things (IoT) device, wherein each of the IoT device and a user who uses the IoT device has a digital account, the IoT device comprises:

a communicator that obtains first transaction data for allowing the user who used the IoT device to transfer a first amount corresponding to a usage amount of the IoT device, the first transaction data including (i) an address of the digital account of the user, the address indicating a source of payment, (ii) an address of the digital account of the IoT device, the address indicating a destination of the payment, and (iii) the first amount indicating the usage amount of the IoT device; and a processor that (i) specifies the digital account of the IoT device by referring to first association information associating the address of the digital account of the IoT device included in the first transaction data obtained and an identifier uniquely assigned to hardware of the IoT device and (ii) transfers the usage amount of the IoT device to the digital account of the IoT device by deducting the first amount from the digital account of the user and adding the first amount to the digital account of the IoT device based on the first transaction data obtained, the IoT device is owned by two or more owners, and when the first amount is transferred to the digital account of the IoT device, the processor:

specifies the two or more owners of the IoT device and allocation information indicating allocation for each of the two or more owners by referring to second association information associating addresses of digital accounts of the two or more owners of the IoT device with the allocation information;

determines an amount of allocation for each of the two or more owners based on the allocation information; and allocates, to a digital account of each of the two or more owners specified, the first amount transferred to the digital account of the IoT device, according to the amount of allocation determined, each of the address of the digital account of the user, the address of the digital account of the IoT device, and the addresses of digital accounts of the two or more owners is a blockchain address, each of the digital account of the user, the digital account of the IoT device, and the digital accounts of the two or more owners specified is managed on a blockchain, the processor further:

stores, into the blockchain, the first transaction data obtained to operate a smart contract managed on the blockchain;

causes the smart contract to transfer the first amount from the digital account of the user to the digital account of the IoT device; and allocates, by the smart contract, the first amount transferred to the digital account of the IoT device to the digital accounts of the two or more owners specified, the IoT device is photovoltaic equipment that transmits electric power generated using a solar cell, the user uses the electric power through use of the photovoltaic equipment, and the usage amount of the IoT device is an amount on an electric bill.

14. A non-transitory computer-readable recording medium having recorded thereon a program for causing a computer to execute a control method, wherein each of an Internet of things (IoT) device and a user who uses the IoT device has a digital account, the control method includes:

obtaining first transaction data for allowing the user who used the IoT device to transfer a first amount corresponding to a usage amount of the IoT device, the first transaction data including (i) an address of the digital account of the user, the address indicating a source of payment, (ii) an address of the digital account of the IoT device, the address indicating a destination of the payment, and (iii) the first amount indicating the usage amount of the IoT device;

specifying the digital account of the IoT device by referring to first association information associating the address of the digital account of the IoT device included in the first transaction data obtained and an identifier uniquely assigned to hardware of the IoT device; and transferring the usage amount of the IoT device to the digital account of the IoT device by deducting the first amount from the digital account of the user and adding the first amount to the digital account of the IoT device based on the first transaction data obtained, the IoT device is owned by two or more owners, the control method further comprises the following, performed when the first amount is transferred to the digital account of the IoT device:

specifying the two or more owners of the IoT device and allocation information indicating allocation for each of the two or more owners by referring to second association information associating addresses of digital accounts of the two or more owners of the IoT device with the allocation information;

determining an amount of allocation for each of the two or more owners based on the allocation information; and allocating, to a digital account of each of the two or more owners specified, the first amount transferred to the digital account of the IoT device, according to the amount of allocation determined, each of the address of the digital account of the user, the address of the digital account of the IoT device, and the addresses of digital accounts of the two or more owners is a blockchain address, each of the digital account of the user, the digital account of the IoT device, and the digital accounts of the two or more owners specified is managed on a blockchain, the control method further comprises:

storing, into the blockchain, the first transaction data obtained to operate a smart contract managed on the blockchain;

causing the smart contract to transfer the first amount from the digital account of the user to the digital account of the IoT device; and allocating, by the smart contract, the first amount transferred to the digital account of the IoT device to the digital accounts of the two or more owners specified, the IoT device is photovoltaic equipment that transmits electric power generated using a solar cell, the user uses the electric power through use of the photovoltaic equipment, and the usage amount of the IoT device is an amount on an electric bill.

* * * * *